US012308657B2

(12) United States Patent
Yang et al.

(10) Patent No.: US 12,308,657 B2
(45) Date of Patent: May 20, 2025

(54) DEVICE TO-BE-CHARGED AND WIRELESS CHARGING METHOD

(71) Applicant: GUANGDONG OPPO MOBILE TELECOMMUNICATIONS CORP., LTD., Guangdong (CN)

(72) Inventors: Jun Yang, Guangdong (CN); Shiming Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 636 days.

(21) Appl. No.: 17/721,601

(22) Filed: Apr. 15, 2022

(65) Prior Publication Data

US 2022/0239155 A1    Jul. 28, 2022

Related U.S. Application Data

(63) Continuation of application No. PCT/CN2020/127486, filed on Nov. 9, 2020.

(30) Foreign Application Priority Data

Nov. 14, 2019  (CN) .......................... 201911115066.4

(51) Int. Cl.
*H02J 50/12* (2016.01)
*H02J 7/00* (2006.01)
(Continued)

(52) U.S. Cl.
CPC .......... *H02J 50/12* (2016.02); *H02J 7/00712* (2020.01); *H02J 7/007194* (2020.01); *H02J 7/02* (2013.01);
(Continued)

(58) Field of Classification Search
CPC .. H02J 50/12; H02J 7/00712; H02J 7/007194; H02J 7/02; H02J 50/80;
(Continued)

(56) References Cited

U.S. PATENT DOCUMENTS

2013/0200708 A1* 8/2013 Ni .......................... H02J 7/0068
307/66
2014/0191710 A1 7/2014 Van Lammeren et al.
(Continued)

FOREIGN PATENT DOCUMENTS

| CN | 103348555 | 10/2013 |
| CN | 105790318 | 7/2016 |

(Continued)

OTHER PUBLICATIONS

EPO, Communication for EP Application No. 20887927.0, Sep. 20, 2023.
(Continued)

*Primary Examiner* — Paul Dinh
(74) *Attorney, Agent, or Firm* — Hodgson Russ LLP

(57) ABSTRACT

A device to-be-charged and a wireless charging method are provided. The device to-be-charged includes a receiving coil, a first charging unit, and a second charging unit. The receiving coil includes a first end, a second end, and a middle tap. The first charging unit is coupled with the first end and the middle tap of the receiving coil and configured to convert an electromagnetic signal received at the first end and the middle tap into a first voltage and a first current for charging a battery. The second charging unit is coupled with the second end and the middle tap of the receiving coil and configured to convert an electromagnetic signal received at the second end and the middle tap into a second voltage and a second current for charging the battery.

16 Claims, 8 Drawing Sheets

(51) Int. Cl.
*H02J 7/02* (2016.01)
*H02J 50/80* (2016.01)
*H01F 38/14* (2006.01)

(52) U.S. Cl.
CPC .............. *H02J 50/80* (2016.02); *H01F 38/14* (2013.01); *H02J 2207/20* (2020.01)

(58) Field of Classification Search
CPC ...... H02J 2207/20; H01F 38/14; H01F 27/29; Y02E 60/10
USPC ......................................................... 320/108
See application file for complete search history.

(56) References Cited

U.S. PATENT DOCUMENTS

| 2016/0268848 | A1  | 9/2016 | Nalbant |
| 2017/0244258 | A1* | 8/2017 | Yao ................... H02J 7/342 |
| 2018/0013309 | A1  | 1/2018 | Winkler et al. |
| 2018/0205260 | A1* | 7/2018 | Maniktala ............... H01F 38/14 |
| 2019/0089154 | A1  | 3/2019 | Corum et al. |

FOREIGN PATENT DOCUMENTS

| CN | 106451705 | 2/2017 |
| CN | 107623344 | 1/2018 |
| CN | 108923545 | 11/2018 |
| CN | 109120029 | 1/2019 |
| CN | 109546711 | 3/2019 |
| CN | 109888863 | 6/2019 |
| CN | 209088635 | 7/2019 |
| EP | 3043439 A1 | 7/2016 |
| EP | 3462564 A1 | 4/2019 |

OTHER PUBLICATIONS

CNIPA, Third Office Action for CN Application No. 201911115066.4, Sep. 28, 2023.
WIPO, International Search Report for PCT/CN2020/127486, Feb. 10, 2021.
CNIPA, First Office Action for CN Application No. 201911115066.4, Dec. 20, 2022.
EPO, Extended European Search Report and Opinion for EP Application No. 20887927.0, Sep. 29, 2022.
CNIPA, Dismissal of Decision for CN Application No. 201911115066.4, Jan. 1, 2024.
CNIPA, Second Office Action for CN Application No. 201911115066.4, Jun. 1, 2023.

* cited by examiner

DEVICE TO-BE-CHARGED AND WIRELESS CHARGING METHOD

CROSS-REFERENCE TO RELATED APPLICATION(S)

This application is a continuation of International Patent Application No. PCT/CN2020/127486, filed Nov. 9, 2020, which claims priority to Chinese Patent Application No. 201911115066.4, filed Nov. 14, 2019, the entire disclosures of which are incorporated herein by reference.

TECHNICAL FIELD

This disclosure relates to the technical field of wireless communication, and particularly to a device to-be-charged and a wireless charging method.

BACKGROUND

At present, for electronic devices such as smartphones, palmtop computers, notebook computers, and power banks, common charging methods include wired charging and wireless charging. If wired charging is adopted for an electronic device, it is necessary to couple a charging adapter and the electronic device to-be-charged via a charging cable before charging. If there is no charging cable, it is impossible to charge the electronic device. However, although wireless charging has an advantage of no charging cable, based on an existing wireless charging solution, due to limitation of a wireless power receiving coil and process requirements of an integrated circuit, increase in charging power is limited and charging efficiency is low.

SUMMARY

In a first aspect, implementations of the disclosure provide a device to-be-charged. The device to-be-charged includes a receiving coil, a first charging unit, and a second charging unit. The receiving coil includes a first end, a second end, and a middle tap. The first charging unit is coupled with the first end and the middle tap of the receiving coil and configured to convert an electromagnetic signal received at the first end and the middle tap into a first voltage and a first current for charging a battery. The second charging unit is coupled with the second end and the middle tap of the receiving coil and configured to convert an electromagnetic signal received at the second end and the middle tap into a second voltage and a second current for charging the battery.

In a second aspect, implementations of the disclosure provide a device to-be-charged. The device to-be-charged includes a receiving coil, a first charging unit, an $i^{th}$ charging unit, and an $(N+1)^{th}$ charging unit. The receiving coil includes a first end, a second end, and N taps, where N is a positive integer and N>1. The first charging unit is coupled with the first end and a first tap of the N taps of the receiving coil and configured to convert an electromagnetic signal received at the first end and the first tap into a first voltage and a first current for charging a battery. The $i^{th}$ charging unit is coupled with an $(i-1)^{th}$ tap and an $i^{th}$ tap of the N taps of the receiving coil and configured to convert an electromagnetic signal received at the $(i-1)^{th}$ tap and the $i^{th}$ tap into an $i^{th}$ voltage and an $i^{th}$ current for charging the battery, where i is a positive integer and $1<i\leq N$. The $(N+1)^{th}$ charging unit is coupled with an $N^{th}$ tap of the N taps and the second end of the receiving coil and configured to convert an electromagnetic signal received at the $N^{th}$ tap and the second end into an $(N+1)^{th}$ voltage and an $(N+1)^{th}$ current for charging the battery.

In a third aspect, implementations of the disclosure provide a wireless charging method. The method is applicable to a device to-be-charged. The method includes the following. An electromagnetic signal is received via a receiving coil. The receiving coil includes a first end, a second end, and a middle tap. A first charging unit is coupled with the first end and the middle tap of the receiving coil. A second charging unit is coupled with the second end and the middle tap of the receiving coil. Via the first charging unit, an electromagnetic signal received at the first end and the middle tap is converted into a first voltage and a first current for charging a battery. Via the second charging unit, an electromagnetic signal received at the second end and the middle tap is converted into a second voltage and a second current for charging the battery. The first voltage and the first current as well as the second voltage and the second current are applied to the battery for charging.

DETAILED DESCRIPTION

Figure 1:
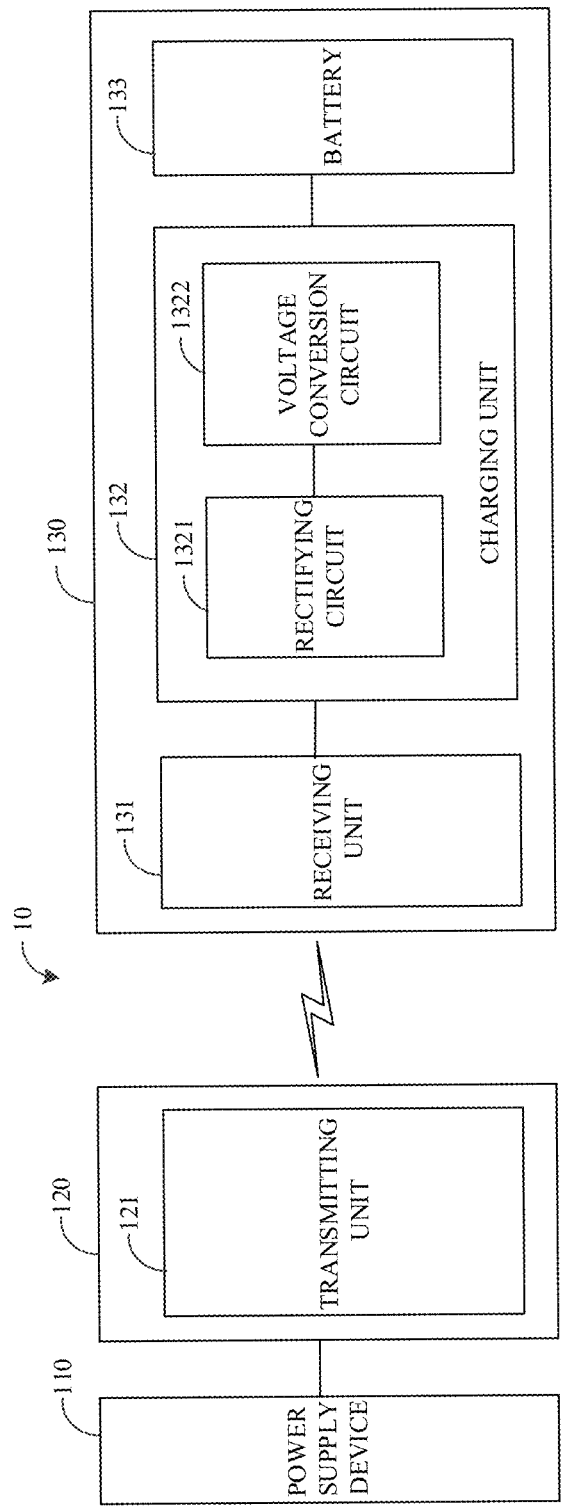
FIG. 1 is a schematic structural diagram of a wireless charging system provided in the related art.

Technical solutions of implementations of the disclosure will be described clearly and completely below with reference to the accompanying drawings of implementations of the disclosure. It can be understood that, specific implementations described herein are merely for explaining, rather than limiting, the disclosure. In addition, it is to be further noted that, for the convenience of description, the accompanying drawings only illustrate parts related to the disclosure.

Wireless charging technologies originate from wireless electrical-energy transmission technologies. According to various wireless charging principles, wireless charging can be in the manner of electromagnetic induction (or magnetic coupling), radio waves, and electromagnetic resonance. At present, main wireless charging standard includes Qi standard, power matters alliance (PMA) standard, alliance for wireless power (A4WP) standard, etc. Under the Qi standard and the PMA standard, electromagnetic induction is adopted for wireless charging, and under the A4WP standard, electromagnetic resonance is adopted for wireless charging. In implementations of the disclosure, a wireless charging technology for a device to-be-charged adopts electromagnetic induction. Energy is transferred from a wireless transmitting apparatus (such as wireless charging base) to the device to-be-charged through a magnetic field, and there is no need to provide a charging cable for connection therebetween. As such, charging can be performed on a battery of the device to-be-charged, which makes charging more convenient.

It can be understood that, the "device to-be-charged" may be a terminal. The "terminal" can include but is not limited to a device configured via a wired line and/or a wireless interface to receive/transmit communication signals. Examples of the wired line may include, but are not limited to, a public switched telephone network (PSTN), a digital subscriber line (DSL), a digital cable, a direct connection cable, and/or another data connection/network. Examples of the wireless interface may include, but are not limited to, a wireless interface with a cellular network, a wireless local area network (WLAN), a digital television (TV) network (such as a digital video broadcasting-handheld (DVB-H) network), a satellite network, an amplitude modulation-frequency modulation (AM-FM) broadcast transmitter, and/or with another communication terminal. A terminal configured to communicate via a wireless interface may be called a "wireless communication terminal", a "wireless terminal", and/or a "mobile terminal". The mobile terminal herein includes but is not limited to a mobile terminal device such as a mobile phone, a tablet computer, a notebook computer, a palmtop computer, a personal digital assistant (PDA), a portable media player (PMP), a navigation device, etc., and may further include a stationary terminal device such as a digital TV, a desktop computer, etc. In addition, the device to-be-charged used in implementations of the disclosure can further include a power bank. The power bank can store received charging energy to provide the energy to other electronic devices. Implementations of the disclosure are not specifically limited in this regard.

Refer to FIG. 1, which is a schematic structural diagram of a wireless charging system 10 provided in the related art. As illustrated in FIG. 1, the wireless charging system 10 includes a power supply device 110, a wireless transmitting apparatus 120, and a device to-be-charged 130. The wireless transmitting apparatus 120 includes a transmitting unit 121. The device to-be-charged 130 includes a receiving unit 131, a charging unit 132, and a battery 133. Here, the wireless transmitting apparatus 120 may be, for example, a wireless charging base, and the device to-be-charged 130 may be, for example, a terminal.

After being coupled with the wireless transmitting apparatus 120, the power supply device 110 transmits an output voltage and an output current of the power supply device 110 to the wireless transmitting apparatus 120.

The wireless charging apparatus 120 can convert, via an internal transmitting unit 121, the output voltage and the output current of the power supply device 110 into a wireless charging signal (electromagnetic signal) for transmission. For example, the transmitting unit 121 can convert the output current of the power supply device 110 into an alternating current (AC), and convert the AC into an electromagnetic signal via a transmitting coil or transmitting antenna.

The device to-be-charged 130 can receive, via the receiving unit 131, an electromagnetic signal transmitted by the transmitting unit 121 and then perform voltage conversion on the electromagnetic signal via the charging unit 132, to obtain a charging voltage and/or a charging current expected by the battery 133 of the device to-be-charged 130. The charging unit 132 includes a rectifying circuit 1321 and a voltage conversion circuit 1322. In other words, via the rectifying circuit 1321, the electromagnetic signal can be converted into an output voltage and an output current of the rectifying circuit 1321. Here, the receiving unit 131 can convert, via a receiving coil or receiving antenna, the electromagnetic signal transmitted by the transmitting unit 121 into an AC. Then the rectifying circuit 1321 rectifies and/or filters the AC to convert the AC into the output voltage and the output current of the rectifying circuit 1321.

In some implementations, before wireless charging, the wireless transmitting apparatus 120 will negotiate in advance with the device to-be-charged 130 a transmission power of the transmitting unit 121. If the power negotiated between the wireless transmitting apparatus 120 and the device to-be-charged 130 is 5 W (watt), the output voltage and the output current of the rectifying circuit 1321 is generally 5V (volt) and 1 A (ampere) respectively. If the power negotiated between the wireless transmitting apparatus 120 and the device to-be-charged 130 is 10.8 W, the output voltage and the output current of the rectifying circuit 1321 is generally 9V and 1.2 A respectively.

If the output voltage of the rectifying circuit 1321 is not suitable for being directly applied to the battery 133, the output voltage of the rectifying circuit 1321 further needs to experience constant-voltage control and/or constant-current control performed by the voltage conversion circuit 1322, to obtain the charging voltage and/or the charging current expected by the battery 133 of the device to-be-charged 130.

The voltage conversion circuit 1322 can be configured to convert the output voltage of the rectifying circuit 1321, such that an output voltage and/or an output current of the voltage conversion circuit 1322 meets requirements on charging voltage and/or charging current of the battery 133. In some implementations, the voltage conversion circuit 1322 may be, for example, a charging integrated circuit (IC), a charge pump circuit, a buck circuit, a buck-boost circuit, or a low dropout (LDO) linear voltage regulator, etc.

In practice, due to influence of volume and IC process on the device to-be-charged 130, the receiving unit 131 usually includes one receiving coil. In addition, a commonly used wireless charging method at present is single-path wireless charging. With continuous increase in requirements on wireless charging power, due to limitation of the receiving coil, a current in the coil cannot be very large. In this case, the charging power can be increased by increasing a voltage of a rectifying bridge of the rectifying circuit 1321. However, according to requirements of an existing IC process, once a voltage exceeds 30V, a cost of the IC process will be very high, which limits further increase in charging power. In addition, design space and heat dissipation space of the device to-be-charged 130 are both very small (for example, mobile terminals are becoming lighter and thinner in physical size, and meanwhile, a large number of electronic components are densely arranged inside the mobile terminal to improve performance of the mobile terminal). As a result, it will be difficult to promptly remove heat accumulated inside the device to-be-charged 130, which results in low charging efficiency.

In order to solve the above problems, implementations of the disclosure provide a device to-be-charged. The device to-be-charged includes a receiving coil, a first charging unit, and a second charging unit. The receiving coil includes a first end, a second end, and a middle tap. The first charging unit is coupled with the first end and the middle tap of the receiving coil and configured to convert an electromagnetic signal received at the first end and the middle tap into a first voltage and a first current for charging a battery. The second charging unit is coupled with the second end and the middle tap of the receiving coil and configured to convert an electromagnetic signal received at the second end and the middle tap into a second voltage and a second current for charging the battery. As such, since a tap is adopted in the receiving coil, it is possible not only to enlarge a coil but also to increase charging paths, thereby increasing a charging power of the device to-be-charged. In addition, since there are multiple charging paths, a charging power of each charging path can be reduced. In this way, heating spots can be dispersed and heating during charging can be reduced, which can also improve charging efficiency.

The following will describe various implementations of the disclosure in detail with reference to the accompanying drawings.

Figure 2:
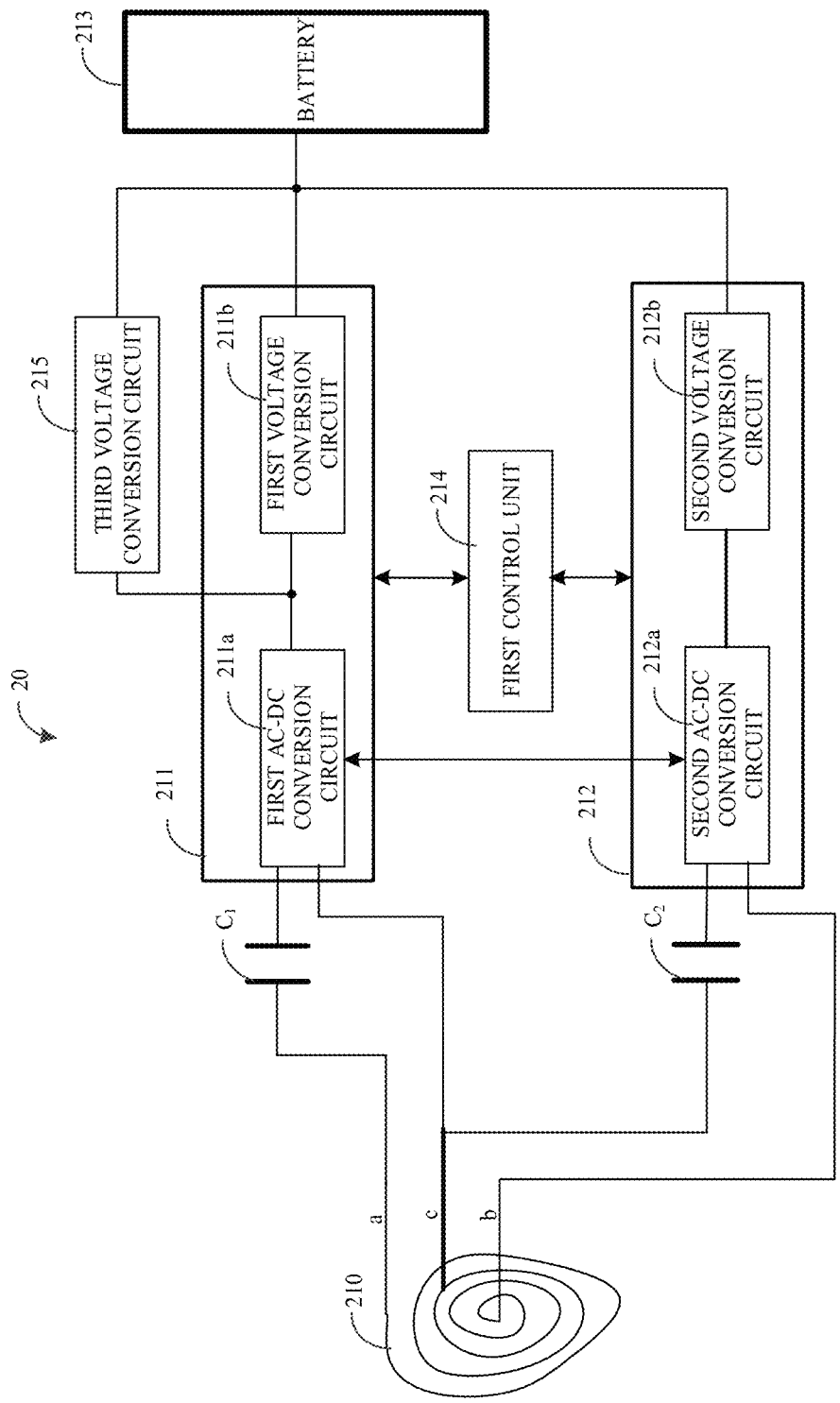
FIG. 2 is a schematic structural diagram of a device to-be-charged provided in implementations of the disclosure.

Refer to FIG. 2, which is a schematic structural diagram of a device to-be-charged 20 provided in implementations of the disclosure. As illustrated in FIG. 2, the device to-be-charged 20 includes a receiving coil 210, a first charging unit 211, and a second charging unit 212. The receiving coil 210 includes a first end a, a second end b, and a middle tap c. The first charging unit 211 is coupled with the first end a and the middle tap c of the receiving coil 210 and configured to convert an electromagnetic signal received at the first end a and the middle tap c into a first voltage and a first current for charging a battery 213. The second charging unit 212 is coupled with the second end b and the middle tap c of the receiving coil and configured to convert an electromagnetic signal received at the second end b and the middle tap c into a second voltage and a second current for charging the battery 213.

It is to be noted that, the tap means one or more joints tapped in a winding process of a coil or winding. It can also be regarded that multiple coils or windings are connected in series, and a lead wire tapped from a serial connection point is called tap. As to the receiving coil 210, a lead-in wire and a lead-out wire at two ends (that is, the first end and the second end) are not counted, and only a lead wire at a middle point (that is, a point between the two ends (the first end and the second end) of the receiving coil 210) is counted. If there is only one lead wire at the middle point, it means that the receiving coil has one tap, and the one tap can be called a center tap. If there are multiple lead wires at middle points, it is means that the receiving coil has multiple taps.

As such, if the receiving coil 210 has one center tap, an electromagnetic signal received can be divided into two electromagnetic signals through the center tap, and the two electromagnetic signals are respectively inputted into two charging units (including the first charging unit 211 and the second charging unit 212) to form two charging paths. In addition, if the receiving coil 210 has multiple taps, an electromagnetic signal received can be divided into multiple electromagnetic signals through the multiple taps, and the multiple electromagnetic signals are respectively inputted into multiple charging units to form multiple charging paths.

In implementations of the disclosure, since the center tap is adopted in the receiving coil 210, two charging paths can be formed and the battery 213 can be charged through each charging path, which is possible to increase a charging power of the device to-be-charged 20. In addition, since there are two charging paths, a charging power of each charging path can be reduced. In this way, heating spots can be dispersed and heating during charging can be reduced, which can improve charging efficiency.

In some implementations, based on the device to-be-charged 20 illustrated in FIG. 2, the device to-be-charged 20 further includes a first control unit 214. The first control unit 214 is configured to control the first charging unit 211 and/or the second charging unit 212 to work according to a charging mode or a charging stage of the battery 213 to charge the battery 213. The charging mode includes a first charging mode and a second charging mode, where a charging speed in the first charging mode is higher than that in the second charging mode. The charging stage of the battery at least includes one of the following charging stages: a trickle charging stage, a constant-current charging stage, and a constant-voltage charging stage.

It is to be noted that, in a possible implementation, the first charging mode may correspond to the constant-current charging stage, and the second charging mode may correspond to the trickle charging stage and/or the constant-voltage charging stage.

In another possible implementation, the charging mode may not correspond to the charging stage, that is, the charging mode corresponds to a charging speed. For example, in a quick-charging mode of high charging speed, when a required charging power is higher than a set value, it is the first charging mode, and two charging units (including the first charging unit 211 and the second charging unit 212) may work together. Otherwise, in a normal charging mode of low charging speed, it is the second charging mode, and only one charging unit (the first charging unit 211 or the second charging unit 212) works. In this case, in the first charging mode, the working charging unit may be consistent with the constant-current charging stage; in the second charging mode, the working charging unit may be consistent with the trickle charging stage and/or the constant-voltage charging stage.

In addition, based on the device to-be-charged 20 illustrated in FIG. 2, the first charging unit 211 includes a first AC-direct current (DC) conversion circuit 211a and a first voltage conversion circuit 211b. The second charging unit 212 includes a second AC-DC conversion circuit 212a and a second voltage conversion circuit 212b.

As illustrated in FIG. 2, in a first charging path, the first end a and the middle tap c of the receiving coil 210 are coupled with the first AC-DC conversion circuit 211a, the first AC-DC conversion circuit 211a is coupled with the first voltage conversion circuit 211b, and the first voltage conversion circuit 211b is coupled with the battery 213, to charge the battery 213. In a second charging path, the second end b and the middle tap c of the receiving coil 210 are coupled with the second AC-DC conversion circuit 212a, the second AC-DC conversion circuit 212a is coupled with the second voltage conversion circuit 212b, and the second voltage conversion circuit 212b is coupled with the battery 213, to charge the battery 213.

It is to be noted that, the first AC-DC conversion circuit 211a or the second AC-DC conversion circuit 212a is configured to perform AC-DC voltage conversion on a corresponding electromagnetic signal received from the receiving coil 210 to obtain a DC voltage and a DC current. The first voltage conversion circuit 211b or the second voltage conversion circuit 212b is configured to perform DC-DC voltage conversion on the DC voltage and the DC current to obtain an output voltage and an output current of a corresponding charging unit. For example, in the first charging path, the first voltage and the first current outputted by the first charging unit 211 may be applied to the battery 213 for charging. In the second charging path, the second voltage and the second current outputted by the second charging unit 212 may be applied to the battery 213 for charging.

In addition, the first control unit 214 is specifically configured to control the first AC-DC conversion circuit 211a and the first voltage conversion circuit 211b to work and/or control the second AC-DC conversion circuit 212a and the second voltage conversion circuit 212b to work, according to the charging mode or the charging stage of the battery 213.

It is to be noted that, the first control unit 214 may be a separate microcontroller unit (MCU) of the device to-be-charged 20, and as such, it is possible to improve reliability in control. In some implementations, the first control unit 214 may also be an application processor (AP) of the device to-be-charged 20, and as such, it is possible to save hardware cost. Implementations of the disclosure are not specifically limited in this regard.

It is to be further noted that, during charging of a device to-be-charged, the charging stage may include the trickle charging stage, the constant-current charging stage, and the constant-voltage charging stage. The trickle charging stage is mainly used for pre-charging a fully discharged battery (recovery charging). Trickle charging is adopted usually when a battery voltage of a single-cell lithium battery is lower than about 3V. A trickle-charging current is usually one tenth of a constant-current charging current. As to the constant-current charging stage, when the battery voltage rises above a trickle-charging threshold, increase a charging current for constant-current charging. A current for constant-current charging is generally 0.2 C (coulomb)~1.0 C. In addition, in the constant-current charging stage, the battery voltage gradually increases with a constant-current charging process. Generally, a voltage of a single-cell lithium battery in the constant-current charging stage ranges from 3.0V to 4.2V. As to the constant-voltage charging stage, when the battery voltage rises to 4.2V, the constant-current charging stage ends and the constant-voltage charging stage begins. As the charging process continues, the charging current gradually decreases. When the charging current decreases to 0.01 C, it can be considered that charging is cut-off. Here, C represents a nominal capacity of the battery, and 0.01 C can be regarded as a charging cut-off current of the battery.

In implementations of the disclosure, as to the charging stage, there can be no constant-voltage charging stage, that is, the charging stage includes only the trickle charging stage and the constant-current charging stage. Alternatively, the constant-voltage charging stage may be adjusted to a multi-stage constant-voltage charging stage, that is, the charging stage includes the trickle charging stage, the constant-current charging stage, and the multi-stage constant-voltage charging stage. Implementations of the disclosure are not specifically limited in this regard.

In some implementations, the first voltage conversion circuit 211b is a buck circuit, a charging IC, or a buck-boost circuit.

In addition, the first control unit 214 is configured to control the first voltage conversion circuit 211b to work in one or more of the following charging stages: the trickle charging stage, the constant-current charging stage, and the constant-voltage charging stage.

In some implementations, the second voltage conversion circuit 212b is a charge pump circuit.

In addition, the first control unit 214 is configured to control the second voltage conversion circuit 212b to work in the constant-current charging stage.

It is to be noted that, the buck circuit, the charging IC, the buck-boost circuit, or the charge pump circuit each is a DC-DC voltage conversion circuit. A ratio of an input voltage to an output voltage of the charge pump circuit may be 1:1, 2:1, 3:1, . . . , N:1, etc. The charging IC can be an integration of a recognizing circuit, an LDO circuit (voltage stabilizing circuit), a buck/boost circuit, a path management circuit, a temperature detecting circuit, etc. However, implementations of the disclosure are not specifically limited in this regard.

In some implementations, the first voltage conversion circuit 211b and the second voltage conversion circuit 212b each are a charge pump circuit. In this case, the device to-be-charged 20 may further include a third voltage conversion circuit 215 coupled with the first AC-DC conversion circuit 211a and/or the second AC-DC conversion circuit 212a. The third voltage conversion circuit 215 is a charging IC, a buck circuit, or a buck-boost circuit.

In addition, the first control unit 214 is configured to control the first voltage conversion circuit 211b and the second voltage conversion circuit 212b to work in the constant-current charging stage, and control the third voltage conversion circuit 215 to work in the trickle charging stage and/or the constant-voltage charging stage.

Figure 3:
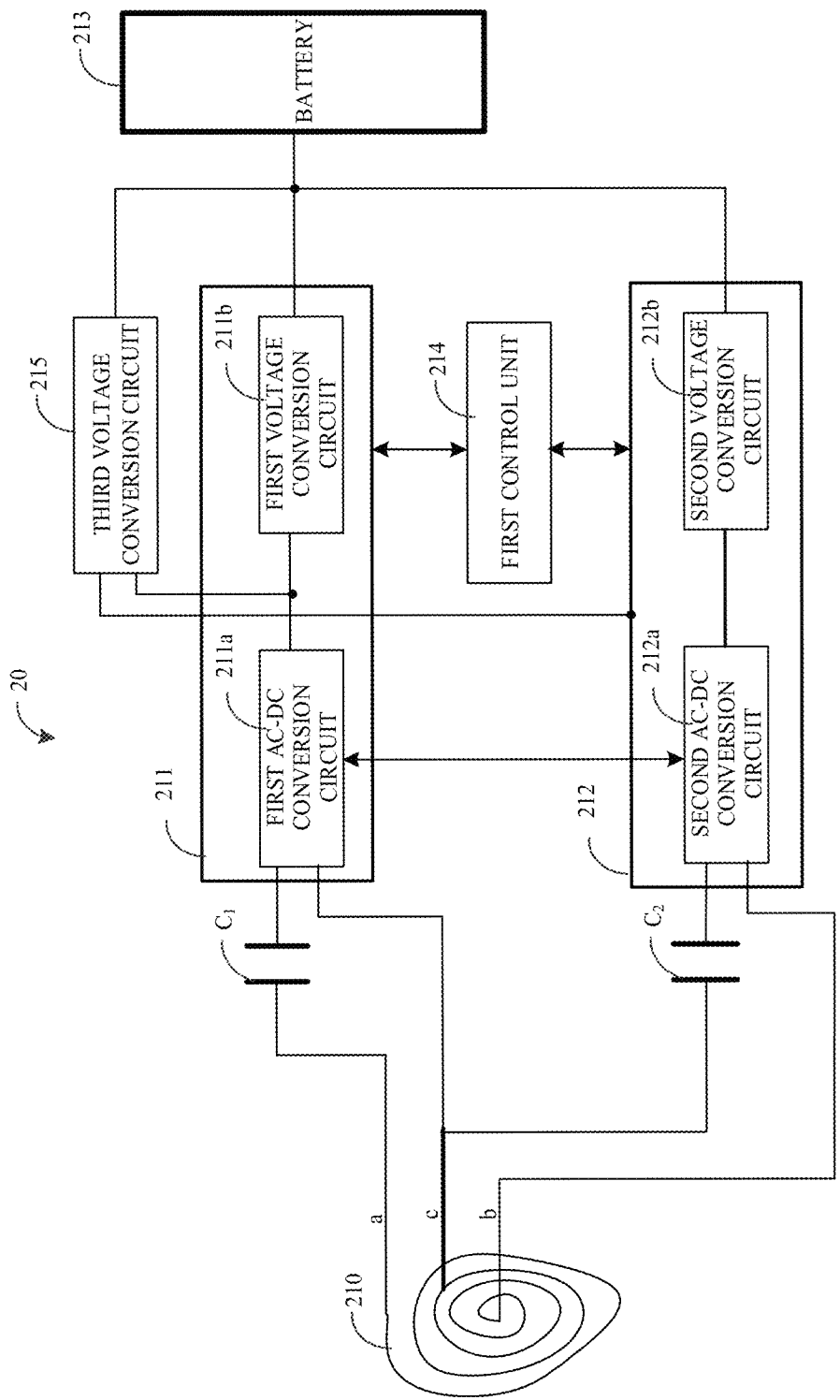
FIG. 3 is a schematic structural diagram of another device to-be-charged provided in implementations of the disclosure.

It is to be noted that, as to the third voltage conversion circuit 215, when the third voltage conversion circuit 215 is coupled with only one AC-DC conversion circuit (such as the first AC-DC conversion circuit 211a or the second AC-DC conversion circuit 212a), for example, as illustrated in FIG. 2, the third voltage conversion circuit 215 is coupled with first AC-DC conversion circuit 211a, in the trickle charging stage and/or the constant-voltage charging stage, the battery 213 is charged via the third voltage conversion circuit 215 through only one charging path. When the third voltage conversion circuit 215 is coupled with two AC-DC conversion circuits (such as the first AC-DC conversion circuit 211a and the second AC-DC conversion circuit 212a) at the same time, for example, as illustrated in FIG. 3, the third voltage conversion circuit 215 is coupled with both the first AC-DC conversion circuit 211a and the second AC-DC conversion circuit 212a, in the trickle charging stage and/or the constant-voltage charging stage, the battery 213 is charged via the third voltage conversion circuit 215 through the two charging paths simultaneously.

Specifically, the first voltage conversion circuit 211b may realize DC-DC conversion on a voltage and a current outputted by the first AC-DC conversion circuit 211a, such that a first voltage and a first current outputted by the first voltage conversion circuit 211b can be directly applied to the battery 213. The second voltage conversion circuit 212b may realize DC-DC conversion on a voltage and a current outputted by the second AC-DC conversion circuit 212a, such that a second voltage and a second current outputted by the second voltage conversion circuit 212b can be directly applied to the battery 213. The third voltage conversion circuit 215 can also realize DC-DC conversion on the voltage and the current outputted by the first AC-DC conversion circuit 211a and/or DC-DC conversion on the voltage and the current outputted by the second AC-DC conversion circuit 212a, such that a third voltage and a third current outputted by the third voltage conversion circuit 215 can be directly applied to the battery 213. The first voltage conversion circuit 211b and the second voltage conversion circuit 212b usually work in the constant-current charging stage, and the third voltage conversion circuit 215 usually works in the trickle charging stage and/or the constant-voltage charging stage.

Figure 4:
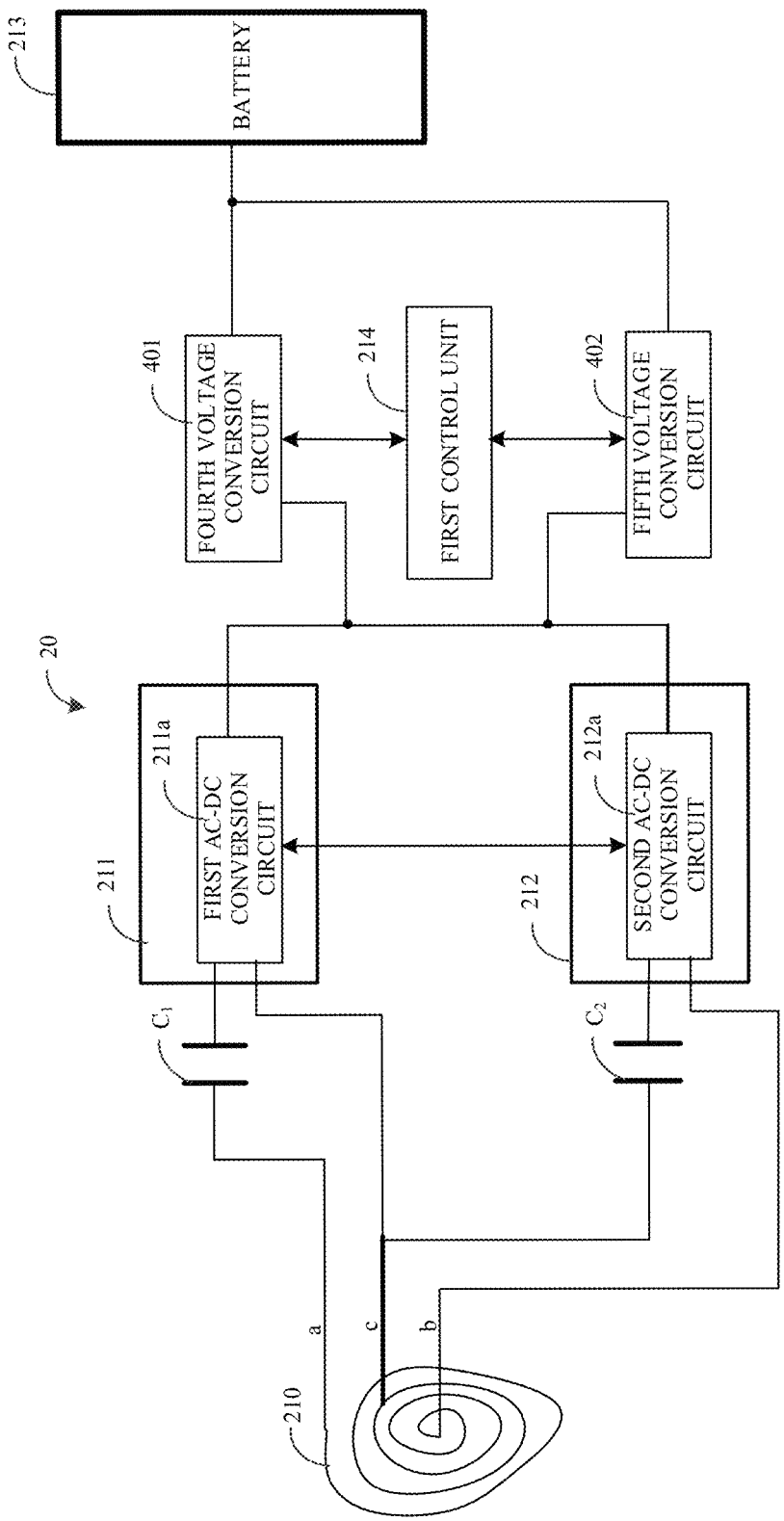
FIG. 4 is a schematic structural diagram of another device to-be-charged provided in implementations of the disclosure.

In some implementations, based on the device to-be-charged 20 illustrated in FIG. 2, as illustrated in FIG. 4, the first charging unit 211 may include a first AC-DC conversion circuit 211a. The second charging unit 212 may include a second AC-DC conversion circuit 212a. In this case, the device to-be-charged 20 may further include a fourth voltage conversion circuit 401 and a fifth voltage conversion circuit 402. The first control unit 214 is configured to control the fourth voltage conversion circuit 401 to work in the constant-current charging stage, and control the fifth voltage conversion circuit 402 to work in the trickle charging stage and/or the constant-voltage charging stage.

The fourth voltage conversion circuit 401 is a charge pump circuit, and the fifth voltage conversion circuit 402 is a charging IC, a buck circuit, or a buck-boost circuit.

It is to be noted that, in FIG. 4, the fourth voltage conversion circuit 401 is coupled with both the first AC-DC conversion circuit 211a and the second AC-DC conversion circuit 212a. In this case, in the constant-current charging stage, the battery 213 is charged via the fourth voltage conversion circuit 401 through two charging paths simultaneously. In FIG. 4, the fifth voltage conversion circuit 402 is coupled with both the first AC-DC conversion circuit 211a and the second AC-DC conversion circuit 212a. In this case, in the trickle charging stage and/or the constant-voltage charging stage, the battery 213 is charged via the fifth voltage conversion circuit 402 through two charging paths simultaneously.

Besides, the fifth voltage conversion circuit 402 may also be coupled with only one AC-DC conversion circuit (the first AC-DC conversion circuit 211a or the second AC-DC conversion circuit 212a). In this case, in the trickle charging stage and/or the constant-voltage charging stage, the battery 213 is charged via the fifth voltage conversion circuit 402 through only one charging path. In other words, when the fifth voltage conversion circuit 402 is coupled with only the first AC-DC conversion circuit 211a, in the trickle charging stage and/or the constant-voltage charging stage, the battery 213 is charged via the first AC-DC conversion circuit 211a and the fifth voltage conversion circuit 402 through the first charging path. When the fifth voltage conversion circuit 402 is coupled only with the second AC-DC conversion circuit 212a, in the trickle charging stage and/or the constant-voltage charging stage, the battery 213 is charged via the second AC-DC conversion circuit 212a and the fifth voltage conversion circuit 402 through the second charging path.

In some implementations, the first control unit 214 is further configured to generate feedback information according to at least one of the following charging parameters and feed back the feedback information to a wireless transmitting apparatus: a charging voltage across the battery 213, a charging current of the battery 213, an output current of the first AC-DC conversion circuit 211a, an output voltage of the first AC-DC conversion circuit 211a, an output current of the second AC-DC conversion circuit 212a, and an output voltage of the second AC-DC conversion circuit 212a.

Specifically, the charging voltage across the battery 213 and the charging current of the battery 213 are used for the wireless transmitting apparatus to determine a transmission power. The output current of the first AC-DC conversion circuit 211a, the output voltage of the first AC-DC conversion circuit 211a, the output current of the second AC-DC conversion circuit 212a, and the output voltage of the second AC-DC conversion circuit 212a are used for the wireless transmitting apparatus to determine a transmission voltage when determining the transmission power.

In addition, the first control unit 214 is configured to determine a required charging power according to a charging voltage across the battery and/or a charging current of the battery, and feed back the required charging power to a wireless transmitting apparatus, to make the wireless transmitting apparatus adjust a transmission power of an electromagnetic signal according to the required charging power.

It is to be noted that, at a device to-be-charged 20 side, supposing that only charging power is considered, the required charging power can be determined according to the charging voltage across the battery 213 and/or the charging current of the battery 213. Then the required charging power can be sent to the wireless transmitting apparatus, such that the wireless transmitting apparatus can adjust the transmission power.

In addition, the first control unit 214 is configured to determine a required current according to an output current and/or an output voltage of the first AC-DC conversion circuit, and/or according to an output current and/or an output voltage of the second AC-DC conversion circuit. The first control unit 214 is further configured to feed back the required current to a wireless transmitting apparatus, to make the wireless transmitting apparatus adjust a transmission power of an electromagnetic signal according to the required current.

It is to be noted that, at a device to-be-charged 20 side, supposing that only heating of the receiving coil 210 is considered, a first required current can be determined according to the output current and/or the output voltage of the first AC-DC conversion circuit 211a, a second required current can be determined according to the output current and/or the output voltage of the second AC-DC conversion circuit 212a, and the required current can be determined according to the first required current and the second required current. Then the required current is sent to the wireless transmitting apparatus, such that the wireless transmitting apparatus can adjust the transmission power.

Here, the required current can determined according to the first required current and the second required current. Specifically, if two charging paths have the same required current, that is, the first required current is the same as the second required current, any one of the two can be selected to be a required current to-be-determined. If the two charging paths have different required currents, that is, the first required current is different from the second required current, a main charging path can be determined from the two charging paths, and then a required current of the main charging path can be taken as the required current to-be-determined; alternatively, a maximum value of the first required current and the second required current can be selected and taken as the required current to-be-determined, that is, a required current of a charging path with more serious heating is taken as the required current to-be-determined. Implementations of the disclosure are not specifically limited in this regard.

It is to be further noted that, an output current of an AC-DC conversion circuit (including the first AC-DC conversion circuit 211a and/or the second AC-DC conversion circuit 212a) may be an output current of the receiving coil 210, or may be a current in a charging path, for example, a current in the first charging path from the receiving coil 210 to the first voltage conversion circuit 211b, or a current in the second charging path from the receiving coil 210 to the second voltage conversion circuit 212b. The first voltage conversion circuit 211b and the second voltage conversion circuit 212b can be those illustrated in FIG. 7 for example.

In other words, the output current of the AC-DC conversion circuit may be any current that can reflect the current of the receiving coil 210, and implementations of the disclosure are not specifically limited in this regard.

In addition, since the middle tap is adopted in the receiving coil 210, two charging paths can be obtained, that is, the first charging path where the first charging unit 211 is located and the second charging path where the second charging unit 212 is located. A related parameter (output voltage and/or output current) of each charging path is separately obtained. However, there is only one transmitting coil in the wireless transmitting apparatus, that is, information to be fed back to the wireless transmitting apparatus can only be a related parameter of one of the charging paths. In this case, if factors such as the number of turns, material, winding manner, process, tap position, etc. of receiving coil 210 are taken into consideration, it is possible to ensure that charging powers of the two charging paths are nearly the same, that is, a transmission power of the wireless transmitting apparatus is evenly allocated. In this situation, for the required current, the required current can be determined with respect to any charging path selected from the two charging paths. However, in practice, due to influence of factors such as the number of turns, material, winding manner, process, tap position, etc. of receiving coil 210, charging powers of the two charging paths are different. In this case, power is allocated through the first control unit, for example, one third of the power is allocated to the first charging path, and two thirds of the power is allocated to the second charging path. In this situation, for the required current, since required currents of the two charging paths are different, a required current of the main charging path can be taken as the required current to-be-determined, or a required current of the charging path with more serious heating can be taken as the required current to-be-determined. Then the required current is sent to the wireless transmitting apparatus, such that the wireless transmitting apparatus can adjust the transmission power.

It is to be noted that, if the output current of the receiving coil 210 is excessively large during charging, it will result in serious heating of the receiving coil. In some implementations, the first control unit 214 is further configured to detect the output current of the receiving coil, and compare the detected output current with a preset current range. If the detected output current does not match (that is, satisfy) the preset current range, it indicates that the transmission power of the wireless transmitting apparatus needs to be adjusted. In this case, the required current determined can be fed back to the wireless transmitting apparatus, such that the wireless transmitting apparatus can adjust a transmission power of an electromagnetic signal according to the required current.

Here, the preset current range means an output current range of the receiving coil that is set in advance for a present charging stage, for example, the preset current range may be 0.95 A~1.05 A. In practice, the preset current range is set according to actual needs. It is possible to set both a maximum preset value (such as 1.05 A) and a minimum preset value (such as 0.95 A), or set only the maximum preset value (such as 1.05 A), and implementations of the disclosure are not specifically limited in this regard.

In addition, the first control unit 214 is configured to determine a required charging power according to a charging voltage across the battery and/or a charging current of the battery, and determine a required current according to an output current and/or an output voltage of the first AC-DC conversion circuit, and/or according to an output current and/or an output voltage of the second AC-DC conversion circuit. The first control unit 214 is further configured to determine a required voltage according to the required charging power and the required current. The first control unit 214 is configured to feed back the required voltage to a wireless transmitting apparatus, to make the wireless transmitting apparatus adjust a transmission power of an electromagnetic signal according to the required voltage.

It is to be noted that, at a device to-be-charged 20 side, if both charging power and heating of the receiving coil are considered, the required charging power can be determined according to a related parameter of the battery 213 (such as the charging voltage across the battery 213 and/or the charging current of the battery 213), and the required current can be determined according to a related parameter of an AC-DC conversion circuit (such as the output current and/or the output voltage of the first AC-DC conversion circuit 211*a*, and/or the output current and/or the output voltage of the second AC-DC conversion circuit 212*a*). The required voltage can be determined according to the required charging power and the required current. Then the required voltage is fed back to the wireless transmitting apparatus, such that the wireless transmitting apparatus can adjust the transmission power.

Here, the required voltage is determined according to the required charging power and the required current. Specifically, a first required power of the first charging path and a second required power of the second charging path are determined according to a preset power allocation principle. Since the required current is determined according to a main charging path or a charging path with more serious heating, after obtaining a required power corresponding to the main charging path or the charging path with more serious heating (the first required power or the second required power), a required voltage corresponding to the main charging path or the charging path with more serious heating can be determined and then used as a required voltage to-be-determined. Alternatively, after obtaining a first required current corresponding to the first charging path and a second required current corresponding to the second charging path, a first required voltage corresponding to the first charging path can be determined according to the first required power and the first required current, and a second required voltage corresponding to the second charging path can be determined according to the second required power and the second required current. If the main charging path or the charging path with more serious heating is the first charging path, the required voltage to-be-determined is the first required voltage. If the main charging path or the charging path with more serious heating is the second charging path, the required voltage to-be-determined is the second required voltage. Implementations of the disclosure are not specifically limited in this regard.

In addition, the first control unit 214 is further configured to, after determining the required voltage, compare the required voltage with an output voltage of the first AC-DC conversion circuit and/or an output voltage of the second AC-DC conversion circuit that is currently received, to determine a voltage difference. The first control unit 214 is further configured to feed back the voltage difference to the wireless transmitting apparatus, to make the wireless transmitting apparatus adjust a transmission power of an electromagnetic signal according to the voltage difference.

In addition, the first control unit 214 is further configured to send to a wireless transmitting apparatus feedback information indicating to increase a transmission voltage or decrease a transmission voltage.

It is to be noted that, at a device to-be-charged 20 side, when both charging power and heating of the receiving coil are considered, after obtaining the required voltage, if the required voltage is obtained according to the first charging path, the required voltage can be compared with the currently received output voltage of the first AC-DC conversion circuit 211a to determine the voltage difference; if the required voltage is obtained according to the second charging path, the required voltage can be compared with the currently received output voltage of the second AC-DC conversion circuit 212a to determine the voltage difference. Then the determined voltage difference is sent to the wireless transmitting apparatus, such that the wireless transmitting apparatus can adjust the transmission power.

It is to be further noted that, at the device to-be-charged 20 side, whether to increase or decrease the transmission voltage can be determined according to at least one of the following charging parameters obtained: the output current of the first AC-DC conversion circuit 211a, the output voltage of the first AC-DC conversion circuit 211a, the output current of the second AC-DC conversion circuit 212a, and the output voltage of the second AC-DC conversion circuit 212a. In this situation, feedback information indicating to increase the transmission voltage or decrease the transmission voltage can be generated and then sent to the wireless transmitting apparatus for adjustment of the transmission voltage, such that the wireless transmitting apparatus can adjust the transmission power.

In some implementations, the first control unit 214 is further configured to detect a temperature of the battery 213, and send a first instruction to the wireless transmitting apparatus when the detected temperature of the battery is higher than a temperature threshold and lower than a preset temperature value, where the first instruction is used for instructing the wireless transmitting apparatus to adjust a transmission power of an electromagnetic signal.

It is to be noted that, the temperature of the battery 213 can be detected through a temperature sensor. It is also possible to detect a temperature of the receiving coil 210 or even a temperature of a housing of the device to-be-charged 20, and implementations of the disclosure are not specifically limited in this regard. Take detection of the temperature of the battery 213 as an example. The detected temperature is compared with the temperature threshold. If the detected temperature is higher than the temperature threshold, it indicates that the temperature is excessively high. In this case, a charging power of the device to-be-charged can be reduced, that is, the first instruction is sent to the wireless transmitting apparatus, where the first instruction is used for instructing the wireless transmitting apparatus to adjust the transmission power of the electromagnetic signal, thereby reducing the temperature of the battery 213 of the device to-be-charged.

It is to be further noted that, when the receiving coil 210 has one center tap, input voltages of two charging paths can be equal in theory. For example, suppose that a gain between a transmitting coil of the wireless transmitting apparatus and the receiving coil of the device to-be-charged is 1. Since an output current of the receiving coil is the same in the two charging paths and the tap is the center tap, an output voltage of each charging path may be half of an input voltage of an inverse rectifying bridge of the wireless transmitting apparatus. However, due to factors such as the material, winding manner, process, tap position, etc. of the coil, it is hard to ensure the same output voltage in the two charging paths, that is, charging powers of the two charging paths may be different.

In other words, for the two charging paths, a charging power of each charging path may be the same or different. In general, due to factors such as a tap position, winding manner, and the like of the coil, the charging power of each charging path will be different. In addition, with respect to a layout design of each charging path in the device to-be-charged, heating of each charging path may also be different. Therefore, the first control unit can also achieve intelligent control on the charging power of each charging path according to different heating spots of the device to-be-charged.

In some implementations, the first control unit 214 is further configured to detect a temperature at a first temperature-measurement point in the first charging unit 211 and a temperature at a second temperature-measurement point in the second charging unit 212. The first control unit 214 is further configured to adjust a charging power of the first charging unit 211 to obtain an adjusted first voltage and an adjusted first current when the temperature at the first temperature-measurement point is higher than the temperature threshold, and apply the adjusted first voltage and the adjusted first current to the battery 213 for charging.

In addition, the first control unit 214 is further configured to switch off a charging path of the first charging unit 211 to stop charging the battery 213 through the first charging unit 211, when the temperature at the first temperature-measurement point is higher than the temperature threshold.

It is to be noted that, the first temperature-measurement point represents a temperature-measurement point arranged at a heating position in the first charging unit 211. The second temperature-measurement point represents a temperature-measurement point arranged at a heating position in the second charging unit 212. The temperature at the first temperature-measurement point or the temperature at the second temperature-measurement point can be detected through a temperature sensor.

It is to be further noted that, when a temperature of one charging unit obtained is higher than the temperature threshold, it indicates that a temperature of a charging path where the charging unit is located is excessively high, which results in great loss. In this case, a charging power of the charging path can be reduced, or the charging path can be directly switched off. Suppose that the temperature at the first temperature-measurement point is higher than the temperature threshold, in this case, the charging power of the first charging unit 211 can be reduced. Specifically, the charging power of the first charging unit 211 can be reduced by controlling a duty cycle of a switch transistor of the first voltage conversion circuit 211b or a working frequency of the first voltage conversion circuit 211b, where the first voltage conversion circuit 211b is a buck circuit. In addition, in such a process, in order to ensure a charging power at a battery side, the reduced part of charging power may be provided to the second charging unit 212. When a charging path where the first charging unit 211 is located has excessively high temperature and needs to be switched off, a switch transistor of the first AC-DC conversion circuit 211a can be controlled to be off or a switch transistor of the first voltage conversion circuit 211b can be controlled to be off, thereby switching off the first charging path. As such, heating of the device to-be-charged can be reduced, thereby improving charging efficiency.

Accordingly, suppose that the temperature at the second temperature-measurement point is higher than the temperature threshold, in this case, the first control unit 214 needs to adjust a charging power of the second charging unit 212 to obtain an adjusted second voltage and an adjusted second current, and apply the adjusted second voltage and the adjusted second current to the battery 213 for charging. Specifically, the charging power of the second charging unit 212 can be reduced by controlling a duty cycle of a switch transistor of the second voltage conversion circuit 212b or a working frequency of the second voltage conversion circuit 212b, where the second voltage conversion circuit 212b is a buck circuit. In addition, when a temperature of the second charging unit 212 is higher than the temperature threshold, the first control unit 214 can also switch off a charging path of the second charging unit 212, to stop charging the battery through the second charging unit 212. Specifically, a switch transistor of the second AC-DC conversion circuit 212a can be controlled to be off or a switch transistor of the second voltage conversion circuit 212b can be controlled to be off, thereby switching off the second charging path. As such, heating of the device to-be-charged can be reduced, thereby improving charging efficiency.

In some implementations, the first control unit 214 is further configured to detect a charging status of the device to-be-charged 20, and send a second instruction to the wireless transmitting apparatus when the charging status is an abnormal charging status. The second instruction is used for instructing the wireless transmitting apparatus to stop transmitting an electromagnetic signal, so as to stop providing a transmission power to the device to-be-charged. The abnormal charging status includes: a remaining power of the battery is higher than a preset power value, and/or the temperature of the battery is higher than the preset temperature value, and/or the charging voltage across the battery is higher than a preset voltage value, and/or the charging current of the battery is higher than a preset current value.

It is to be noted that, the preset temperature value is greater than the temperature threshold. When the temperature of the battery is higher than the temperature threshold and lower than the preset temperature value, it indicates that the charging status is not the abnormal charging status. In this case, the first instruction is sent to the wireless transmitting apparatus, to instruct the wireless transmitting apparatus to adjust a transmission power of an electromagnetic signal. When the temperature of the battery is higher than the preset temperature value, it indicates that the charging status is the abnormal charging status. In this case, it is necessary to send the second instruction to the wireless transmitting apparatus, to instruct the wireless transmitting apparatus to stop transmitting an electromagnetic signal, so as to stop providing a transmission power to the device to-be-charged.

Take the abnormal charging status that the remaining power of the battery is higher than the preset power value as an example. During charging of the device to-be-charged, the first control unit 214 can also detect the remaining power of the battery 213 and then determine, according to the remaining power detected, whether to continue controlling the wireless transmitting apparatus to provide a transmission power to the device to-be-charged to charge. In other words, the remaining power detected is compared with a preset power value. If the remaining power detected is higher than the preset power value, it indicates that the battery is fully charged. In this case, the charging status is the abnormal charging status, and it is necessary to send the second instruction to the wireless transmitting apparatus, where the second instruction is used for instructing the wireless transmitting apparatus to stop transmitting an electromagnetic signal (that is, to disable signal transmission of the transmitting coil), so as to stop providing a transmission power to the device to-be-charged, thereby stopping charging the battery of the device to-be-charged. In addition, if the remaining power detected is lower than the preset power value, it indicates that the battery is not yet fully charged. In this case, the charging status is a normal charging status, and a third instruction can be sent to the wireless transmitting apparatus, where the third instruction is used for instructing the wireless transmitting apparatus to continue providing a transmission power to the device to-be-charged, so as to continue charging the battery of the device to-be-charged.

In some implementations, the first control unit 214 is further configured to obtain a maximum transmission power of the wireless transmitting apparatus, and when the obtained maximum transmission power is lower than a preset power threshold, control the first charging unit 211 or the second charging unit 212 to work.

Specifically, after obtaining the maximum transmission power of the wireless transmitting apparatus, if the obtained maximum transmission power is lower than the preset power threshold, control the first charging unit 211 to work and control the second charging unit 212 not to work, where the first voltage conversion circuit 211b is at least one of the following: a buck circuit, a charging IC, or an integrated circuit of a charge pump circuit and a charging IC. Alternatively, if the obtained maximum transmission power is lower than the preset power threshold, control the second charging unit 212 to work and control the first charging unit 211 not to work, where the second voltage conversion circuit 212b is at least one of the following: a buck circuit, a charging IC, or an integrated circuit of a charge pump circuit and a charging IC.

It is to be noted that, since a tap is adopted in the receiving coil, multiple charging units can be obtained. However, among the multiple charging units, only one charging unit works at a certain time. For example, if a maximum transmission power that can be provided by the wireless transmitting apparatus is lower than the preset power threshold (such as 15 W), only the first charging unit 211 or the second charging unit 212 is controlled to work. It is to be noted that, for a working charging unit, a voltage conversion circuit included in the charging unit may be a buck circuit, or may be a charging IC, or may be an integrated circuit of a charge pump circuit and a charging IC, and implementations of the disclosure are not specifically limited in this regard.

In some implementations, in each charging path, an AC-DC conversion circuit (such as the first AC-DC conversion circuit 211a or the second AC-DC conversion circuit 212a) may further include a rectifying unit (not illustrated in FIG. 2). The rectifying unit is configured to receive a control signal, and perform AC-DC voltage conversion on a corresponding electromagnetic signal received from the receiving coil 210 according to the control signal to obtain an output voltage and an output current of the AC-DC conversion circuit.

In addition, the device to-be-charged 20 may further include a rectification control unit (not illustrated in FIG. 2). The rectification control unit is configured to send a control signal to the rectifying unit, where the control signal is used for instructing the rectifying unit to perform AC-DC voltage conversion.

It is to be noted that, the rectification control unit may be disposed in the first AC-DC conversion circuit 211a, or may be disposed in the second AC-DC conversion circuit 212a, or may be disposed in the first AC-DC conversion circuit 211a and the second AC-DC conversion circuit 212a. Specifically, when one rectification control unit is provided, the rectification control unit may be disposed in an AC-DC conversion circuit in one charging path. In this case, through the rectification control unit, the control signal is sent to a rectifying unit of an AC-DC conversion circuit in each charging path. Then, with the control signal, a working status of a rectifying bridge of each rectifying unit is controlled, so as to realize AC-DC voltage conversion in each charging path. Alternatively, when two rectification control units are provided, the rectification control units may be disposed respectively in the first AC-DC conversion circuit 211*a* and the second AC-DC conversion circuit 212*a* in the two charging paths, for example, each AC-DC conversion circuit is provided with one rectification control unit and one rectifying unit. In this case, via a rectification control unit of each AC-DC conversion circuit, the control signal is sent to their respective rectifying units. Then, with the control signal, a working status of a rectifying bridge of each rectifying unit is controlled, so as to realize AC-DC voltage conversion in each charging path.

Besides, the rectification control unit may also be disposed in the first control unit 214. Via the first control unit, the control signal is sent to a rectifying unit of an AC-DC conversion circuit in each charging path. Then, with the control signal, a working status of a rectifying bridge of each rectifying unit is controlled, so as to realize AC-DC voltage conversion in each charging path. Thus, implementations of the disclosure are not specifically limited in terms of the position and number of the rectification control unit.

In some implementations, the device to-be-charged 20 may further include a first communicating unit (not illustrated in FIG. 2). The first communicating unit is configured to establish handshake communication between the device to-be-charged and the wireless transmitting apparatus, so as to control the wireless transmitting apparatus to provide a transmission power to the device to-be-charged to charge the battery 213.

It is to be noted that, before charging of the device to-be-charged 20, the device to-be-charged and the wireless transmitting apparatus need be capable of communicating a charging handshake protocol, to establish handshake communication between the device to-be-charged and the wireless transmitting apparatus. In addition, if handshake communication is successfully established, the wireless transmitting apparatus can be controlled to provide a transmission power to the device to-be-charged to charge the battery.

It is to be further noted that, a wireless-charging communication protocol in implementations of the disclosure may include a standard charging protocol such as Qi protocol, or may include a non-standard charging protocol such as universal serial bus (USB)-power delivery (USB-PD) protocol, quick charge (QC) protocol, and the like, which is not specifically limited in implementations of the disclosure. In some implementations, since the wireless transmitting apparatus usually adopts standard Qi protocol for communication, the first communicating unit of the device to-be-charged needs to support the standard Qi protocol.

In implementations of the disclosure, the first communicating unit may be disposed in the first charging unit 211, or may be disposed in the second charging unit 212, or may be disposed in the first charging unit 211 and the second charging unit 212. When one first communicating unit is provided, the first communicating unit is disposed in one charging path (that is, in the first charging unit 211 or in the second charging unit 212). In this case, communication with the wireless transmitting apparatus is realized via the first communicating unit in the first charging unit 211 or in the second charging unit 212. Alternatively, if two first communicating units are provided, the first communicating units are disposed respectively in the first charging unit 211 and the second charging unit 212 in the two charging paths. In this case, the first charging unit 211 and the second charging unit 212 communicate with the wireless transmitting apparatus through time-sharing communication.

Specifically, the first communicating unit may be disposed in the first charging unit 211. In this case, one first communicating unit is provided, and communication with the wireless transmitting apparatus is realized via the first communicating unit. In this situation, communication information (such as charging power, output voltage, and output current) relating to other charging paths (such as the second charging unit 212) may be first sent to the first charging unit 211, and then the first communicating unit in the first charging unit 211 performs information interaction with the wireless transmitting apparatus. Alternatively, the first communicating unit may also be disposed in the first charging unit 211 and the second charging unit 212, that is, each charging unit is provided with one first communicating unit. In this case, two first communicating units are provided. Communication is in the manner of time-sharing communication, that is, each charging unit alternately communicates with the wireless transmitting apparatus.

Besides, the first communicating unit may also be disposed in the first control unit 214. Via the first control unit, handshake communication between the device to-be-charged and the wireless transmitting apparatus is established, to control the wireless transmitting apparatus to provide a transmission power to the device to-be-charged to charge. Thus, implementations of the disclosure are also not specifically limited in terms of the position and number of the first communicating unit.

In other words, when the device to-be-charged adopts in-band communication, for multiple charging paths, one of the charging paths may be selected for communication with the wireless transmitting apparatus, while other charging paths are not used for communication with the wireless transmitting apparatus. In addition, communication may also be realized alternately through different charging path, that is, time-sharing communication is adopted. Furthermore, the device to-be-charged may also adopt out-of-band communication, that is, communicate with the wireless transmitting apparatus through third-party out-of-band communication.

In some implementations, for each charging path, in order to form an LC resonant circuit through inductor (represented by L)-capacitor (represented by C), a resonant capacitor, such as C1 and C2 illustrated in FIG. 2, needs to be disposed between the receiving coil and each charging unit. As such, the receiving coil and the resonant capacitor constitute an LC resonant circuit. It is to be noted that, those skilled in the art can understand that the structure of the device to-be-charged 20 illustrated in FIG. 2 does not constitute any limitation on a device to-be-charged. The device to-be-charged may include more or fewer components than illustrated or may combine certain components or have different configurations or arrangements of components.

The foregoing implementations provide a device to-be-charged. The device to-be-charged includes the receiving coil, the first charging unit, and the second charging unit. The receiving coil includes the first end, the second end, and the middle tap. The first charging unit is coupled with the first end and the middle tap of the receiving coil and configured to convert the electromagnetic signal received at the first end and the middle tap into the first voltage and the first current for charging the battery. The second charging unit is coupled with the second end and the middle tap of the receiving coil and configured to convert the electromagnetic signal received at the second end and the middle tap into the second voltage and the second current for charging the battery. As such, since a tap is adopted in the receiving coil, it is possible not only to enlarge a coil but also to increase charging paths, thereby increasing a charging power of the device to-be-charged. In addition, since there are multiple charging paths, a charging power of each charging path can be reduced. In this way, heating spots can be dispersed and heating during charging can be reduced, thereby improving charging efficiency.

Figure 5:
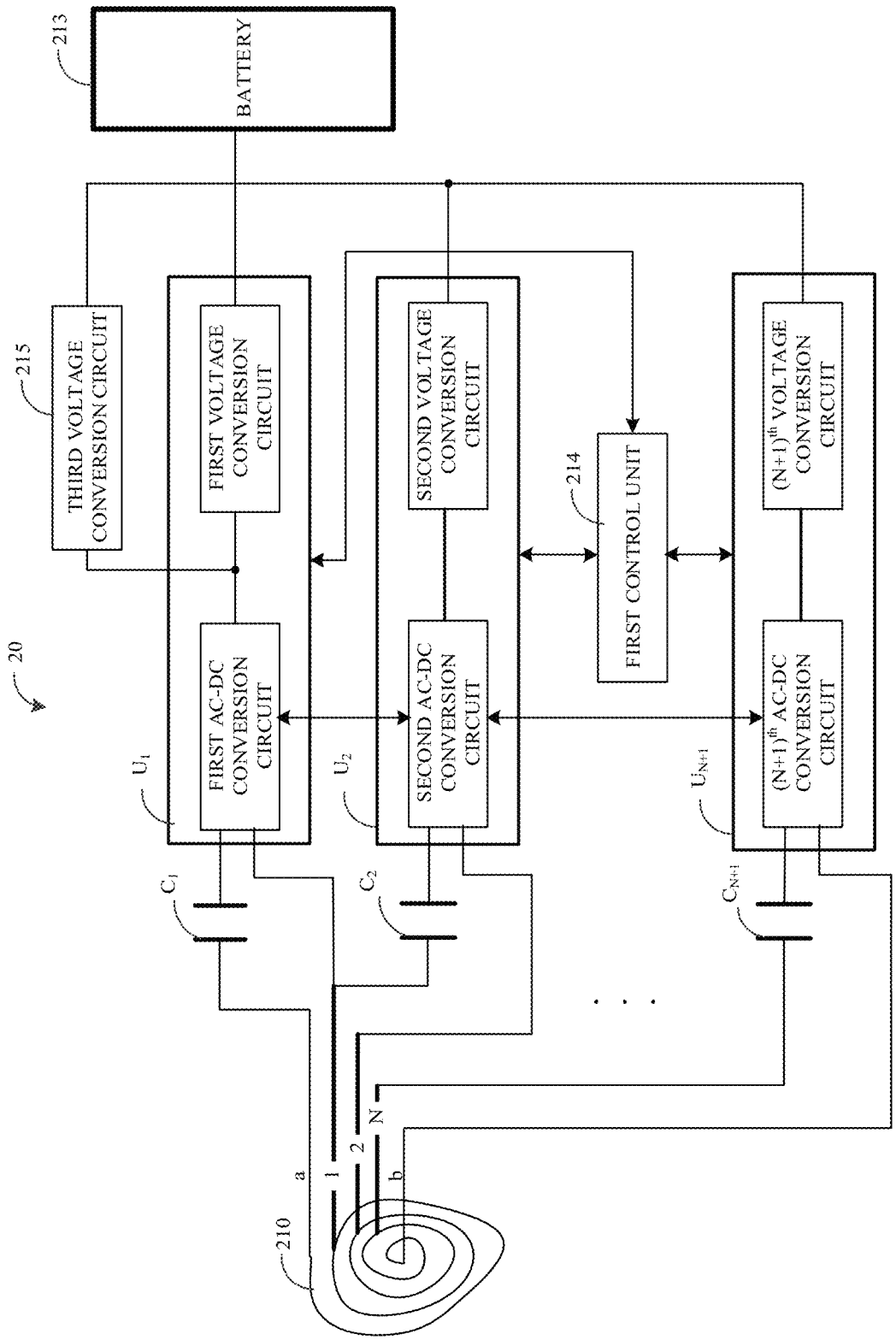
FIG. 5 is a schematic structural diagram of another device to-be-charged provided in implementations of the disclosure.

In addition, the receiving coil 210 may also have multiple taps. In this case, the device to-be-charged 20 may include multiple charging units, to form multiple charging paths. In other words, refer to FIG. 5, which is a schematic structural diagram of another device to-be-charged 20 provided in implementations of the disclosure. As illustrated in FIG. 5, when the receiving coil 210 has multiple taps, the device to-be-charged 20 includes a receiving coil 210, a first charging unit, an $i^{th}$ charging unit, and an $(N+1)^{th}$ charging unit. The receiving coil 210 includes a first end a, a second end b, and N taps (1, 2, ..., N), where N is a positive integer and N>1. The first charging unit is coupled with the first end a and a first tap of the N taps of the receiving coil 210 and configured to convert an electromagnetic signal received at the first end and the first tap into a first voltage and a first current for charging a battery 213. The $i^{th}$ charging unit is coupled with an $(i-1)^{th}$ tap and an $i^{th}$ tap of the N taps of the receiving coil 210 and configured to convert an electromagnetic signal received at the $(i-1)^{th}$ tap and the $i^{th}$ tap into an $i^{th}$ voltage and an $i^{th}$ current for charging the battery 213, where i is a positive integer and $1<i \leq N$. The $(N+1)^{th}$ charging unit is coupled with an $N^{th}$ tap of the N taps and the second end b of the receiving coil 210 and configured to convert an electromagnetic signal received at the $N^{th}$ tap and the second end into an $(N+1)^{th}$ voltage and an $(N+1)^{th}$ current for charging the battery 213.

In addition, a $k^{th}$ charging unit includes a $k^{th}$ AC-DC conversion circuit and a $k^{th}$ voltage conversion circuit, the $k^{th}$ AC-DC conversion circuit is coupled with the $k^{th}$ voltage conversion circuit, and k is a positive integer and $1 \leq k \leq N+1$. The $k^{th}$ AC-DC conversion circuit is configured to perform AC-DC voltage conversion on a $k^{th}$ electromagnetic signal received from the receiving coil 210, to obtain an output voltage and an output current of the $k^{th}$ AC-DC conversion circuit. The $k^{th}$ voltage conversion circuit is configured to perform DC-DC voltage conversion on the output voltage and the output current of the $k^{th}$ AC-DC conversion circuit, to obtain a $k^{th}$ voltage and a $k^{th}$ current for charging the battery 213.

In FIG. 5, multiple resonant capacitors, such as $C_1$, $C_2$, ..., $C_{N+1}$, are provided. The multiple resonant capacitors are respectively coupled between the receiving coil 210 and a charging unit (such as the first charging unit $U_1$, a second charging unit $U_2$, ..., the $(N+1)^{th}$ charging unit $U_{N+1}$) to form multiple charging paths. Here, in a first charging path, the first charging unit $U_1$ includes a first AC-DC conversion circuit and a first voltage conversion circuit, the first AC-DC conversion circuit is coupled with the first voltage conversion circuit, and the first voltage conversion circuit is coupled with the battery 213 to charge the battery 213. In a second charging path, the second charging unit $U_2$ includes a second AC-DC conversion circuit and a second voltage conversion circuit, the second AC-DC conversion circuit is coupled with the second voltage conversion circuit, and the second voltage conversion circuit is coupled with the battery 213 to charge the battery 213. In an $(N+1)^{th}$ charging path, the $(N+1)^{th}$ charging unit $U_{N+1}$ includes an $(N+1)^{th}$ AC-DC conversion circuit and an $(N+1)^{th}$ voltage conversion circuit, the $(N+1)^{th}$ AC-DC conversion circuit is coupled with the $(N+1)^{th}$ voltage conversion circuit, and the $(N+1)^{th}$ voltage conversion circuit is coupled with the battery 213 to charge the battery 213.

In other words, when the receiving coil 210 has multiple taps, an electromagnetic signal received can be divided into multiple electromagnetic signals through the multiple taps, and the multiple electromagnetic signals are respectively inputted into multiple charging units to form multiple charging paths.

In implementations of the disclosure, since taps are adopted in the receiving coil 210, multiple charging paths can be formed and the battery 213 can be charged through each charging path, which is possible to increase a charging power of the device to-be-charged 20. In addition, since there are multiple charging paths, a charging power of each charging path can be reduced. In this way, heating spots can be dispersed and heating during charging can be reduced, which improves charging efficiency.

In some implementations, the battery 213 may include a single cell, or may include multiple cells. When the battery 213 includes multiple cells, the multiple cells may include a multi-cell series structure and a multi-cell parallel structure.

When the battery 213 includes multiple cells, voltages and currents of multiple charging units may be applied together to the multiple cells for charging, or each charging unit may charge one corresponding cell. Implementations of the disclosure are not limited in terms of the manner and circuit structure for charging the multiple cells through the multiple charging units.

Figure 6:
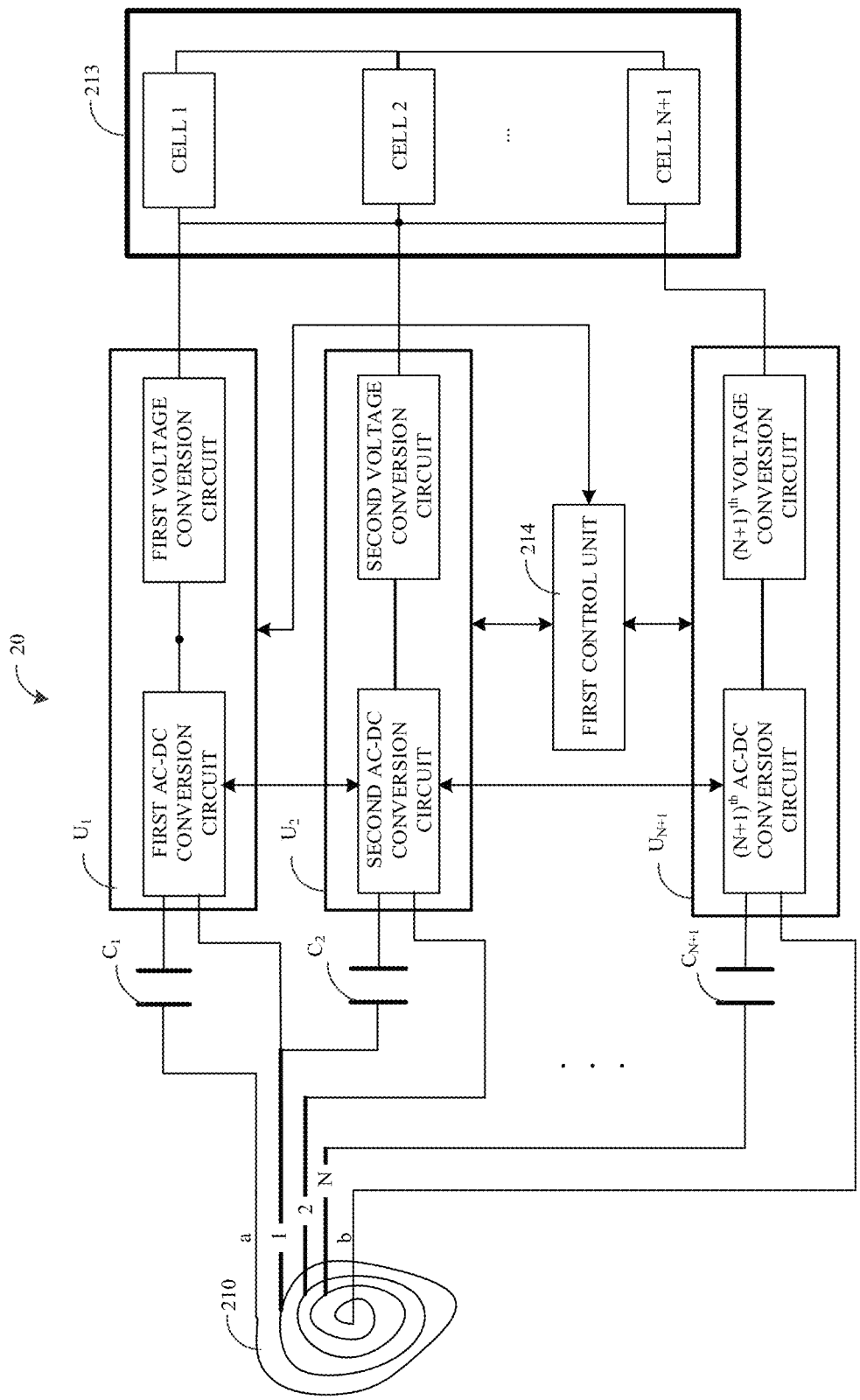
FIG. 6 is a schematic structural diagram of another device to-be-charged provided in implementations of the disclosure.

In addition, as illustrated in FIG. 6, the battery 213 includes cell 1, cell 2, ..., cell N+1, where cell 1, cell 2, ..., cell N+1 are connected in parallel. In this case, a $k^{th}$ cell of the multiple cells is coupled with the $k^{th}$ voltage conversion circuit of the $k^{th}$ charging unit, so as to control each charging path to be responsible for charging one corresponding cell. k is a positive integer and $1 \leq k \leq N+1$.

Specifically, the first voltage conversion circuit in the first charging path is coupled with cell 1, the second voltage conversion circuit in the second charging path is coupled with cell 2, ..., the $(N+1)^{th}$ voltage conversion circuit in the $(N+1)^{th}$ charging path is coupled with cell N+1. As such, cell 1 can be charged through the first charging path, cell 2 can be charged through the second charging path, ..., cell N+1 can be charged through the $(N+1)^{th}$ charging path, which is possible to increase charging speed.

In addition, in order to ensure charging speed and further reduce heating of the device to-be-charged 20, the battery 213 of the device to-be-charged 20 may have a multi-cell series structure, that is, multiple cells (such as cell 1, cell 2, ..., cell N+1) are connected in series. Compared with a single-cell scheme, to achieve an equal charging speed, a charging current required by the multi-cell series structure is 1/K time a charging current required by a single cell (K is the number of cells coupled in series in the device to-be-charged 20). In other words, under the same charging speed, by adopting this implementation of the disclosure, it is possible to substantially decrease a charging current, thereby further decreasing the amount of heat generated by the device to-be-charged 20 during charging.

It is to be noted that, the multiple cells can be cells with the same or similar specification or parameter. Cells with the same or similar specification can facilitate unified management. On the other hand, the overall performance and service life of multiple cells can be improved by adopting cells with the same or similar specification or parameter.

The foregoing implementations provide a device to-be-charged. The device to-be-charged includes the receiving coil, the first charging unit, and the second charging unit. The receiving coil includes the first end, the second end, and the N taps. The first charging unit is coupled with the first end a and the first tap of the N taps of the receiving coil and configured to convert the electromagnetic signal received at the first end and the first tap into the first voltage and the first current for charging a battery. The $i^{th}$ charging unit is coupled with the $(i-1)^{th}$ tap and the $i^{th}$ tap of the N taps of the receiving coil and configured to convert the electromagnetic signal received at the $(i-1)^{th}$ tap and the $i^{th}$ tap into the $i^{th}$ voltage and the $i^{th}$ current for charging the battery, where i is a positive integer and $1<i\leq N$. The $(N+1)^{th}$ charging unit is coupled with the $N^{th}$ tap of the N taps and the second end b of the receiving coil and configured to convert the electromagnetic signal received at the $N^{th}$ tap and the second end into the $(N+1)^{th}$ voltage and the $(N+1)^{th}$ current for charging the battery. As such, since taps are adopted in the receiving coil, it is possible not only to enlarge a coil but also to increase charging paths, thereby increasing a charging power of the device to-be-charged. In addition, since there can be multiple charging paths, a charging power of each charging path can be reduced. In this way, heating spots can be dispersed and heating during charging can be reduced, which can improve charging efficiency.

Figure 7:
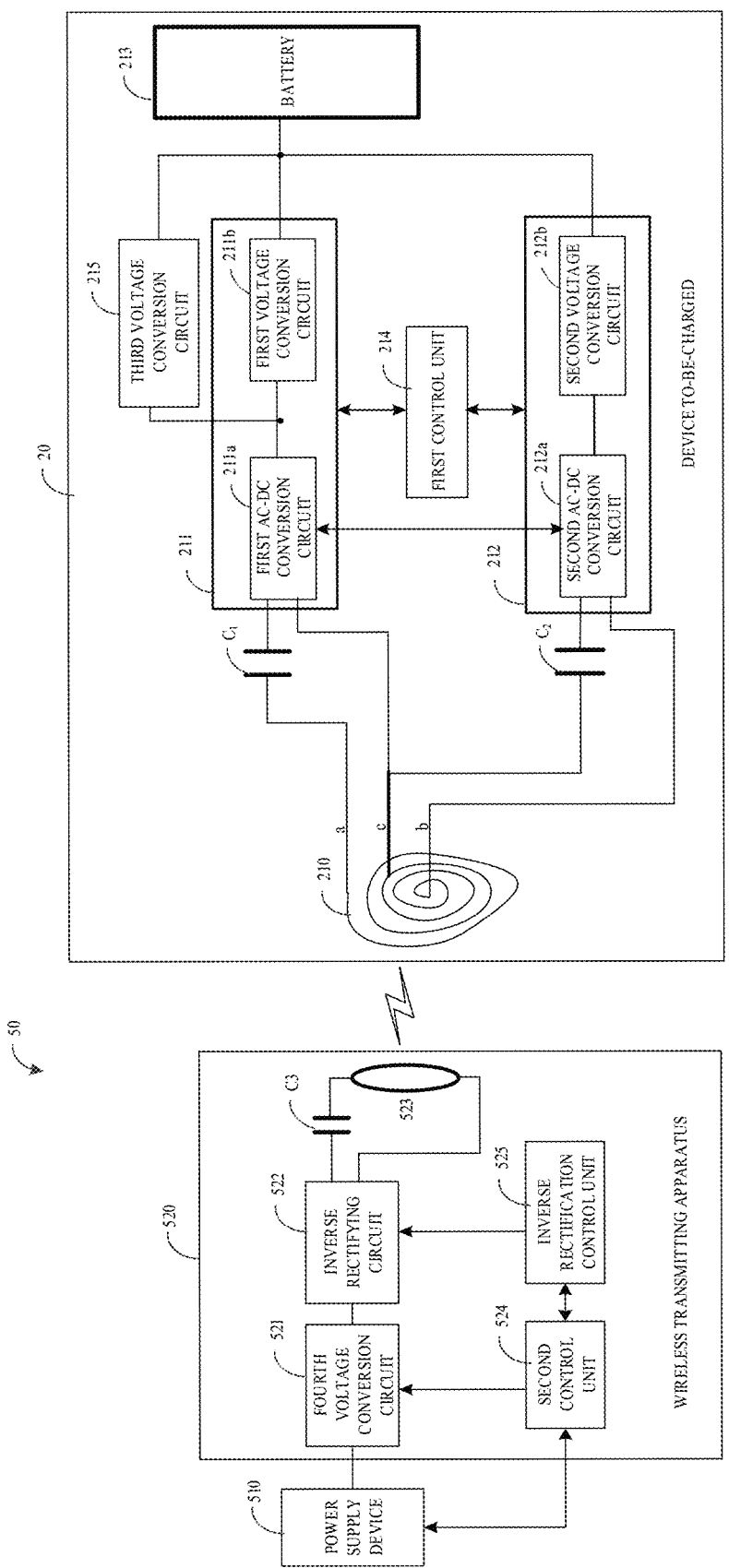
FIG. 7 is a schematic structural diagram of a wireless charging system provided in implementations of the disclosure.

Refer to FIG. 7, which is a schematic structural diagram of a wireless charging system 50 provided in implementations of the disclosure. As illustrated in FIG. 7, the wireless charging system 50 includes a power supply device 510, a wireless transmitting apparatus 520, and the device to-be-charged 20 in any of the foregoing implementations.

The power supply device 510 is configured to power the wireless transmitting apparatus 520. The power supply device 510 may include a rectifying unit, a transforming unit, a control unit, a charging interface, etc. The power supply device 510 can convert an input AC into an output DC to be provided to the wireless transmitting apparatus 520. For example, the power supply device 510 may be an adapter, a power bank, an in-vehicle power supply, etc.

In some implementations, the power supply device 510 can directly provide an AC to the wireless transmitting apparatus 520. For example, the power supply device 510 may be an AC power supply. When the power supply device 510 is an AC power supply, the wireless transmitting apparatus 520 further includes a unit or module for converting AC into DC, such as an inverse rectifying-and-filtering unit, a DC/DC conversion unit, etc.

The wireless transmitting apparatus 520 is configured to convert a DC or AC provided by the power supply device 510 into a wireless charging signal (electromagnetic signal) for power transmission in a wireless manner.

In some implementations, as illustrated in FIG. 7, the wireless transmitting apparatus 520 may include a fourth voltage conversion circuit 521, an inverse rectifying circuit 522, a transmitting coil 523, and a second control unit 524. Those skilled in the art can understand that the structure of the wireless transmitting apparatus 520 illustrated in FIG. 7 does not constitute any limitation on a wireless transmitting apparatus. The wireless transmitting apparatus may include more or fewer components than illustrated or may combine certain components or have different configurations or arrangements of components.

It is to be noted that, the power supply device 510 may be a normal adapter, or may be a voltage-adjustable adapter (that is, the adapter can adjust its own output voltage), or even may be a power bank. If the power supply device 510 is the voltage-adjustable adapter, the wireless transmitting apparatus 520 may not include the fourth voltage conversion circuit 521. Here, the fourth voltage conversion circuit 521 is configured to perform DC-DC voltage conversion, and mainly to adjust an output voltage of the power supply device 510 to a fixed voltage value and provide the adjusted voltage to the inverse rectifying circuit 522.

The inverse rectifying circuit 522 is configured to convert a DC provided by the fourth voltage conversion circuit 521 or a DC provided by the power supply device 510 into an AC that can be coupled to the transmitting coil, and provide the AC to the transmitting coil 523. Via the transmitting coil 523, the AC is converted into an electromagnetic signal for transmission.

In some implementations, the inverse rectifying circuit 522 may include multiple switch transistors (or referred to as inverse rectifying bridge). By controlling an on-time (that is, duty cycle) of the switch transistor, a transmission power can be adjusted. In other words, the wireless transmitting apparatus 520 may further include an inverse rectification control unit 525. The inverse rectification control unit 525 is configured to send a control signal to the inverse rectifying circuit 522. The control signal is used for controlling the on-time (that is, duty cycle) of the switch transistor, thereby adjusting the transmission power. Here, the inverse rectification control unit 525 may be a separate control unit, or may be integrated into the second control unit 524, and implementations of the disclosure are not specifically limited in this regard.

In some implementations, the wireless transmitting apparatus 520 may further include a resonant capacitor C3. The resonant capacitor C3 and the transmitting coil 523 form an LC resonant circuit. In this case, a transmission power of the wireless transmitting apparatus 520 can also be adjusted by controlling a working frequency of the LC resonant circuit.

In some implementations, the wireless transmitting apparatus 520 may be a wireless charging base or a device with an energy storage function. When the wireless transmitting apparatus 520 is the device with an energy storage function, the wireless transmitting apparatus 520 may further include an energy storage module (such as lithium battery, etc.). In this situation, electrical energy is obtained from an external power supply device 510 and stored. As such, the energy storage module can also provide electrical energy to the inverse rectifying circuit 522. Those skilled in the art can understand that, the wireless transmitting apparatus 520 can obtain electrical energy from the external power supply device 510 in a wired or wireless manner. In terms of the wired manner, for example, the wireless transmitting apparatus 520 is coupled with the power supply device 510 via a charging interface (such as Type-C interface or USB interface) to obtain electrical energy. In terms of the wireless manner, for example, the wireless transmitting apparatus 520 may further include a receiving coil and can obtain electrical energy wirelessly from a device with a wireless charging function.

The second control unit 524 is configured to control a wireless charging process. For example, the second control unit 524 may communicate with the power supply device 510, to determine an output voltage and/or an output current of the power supply device. The second control unit 524 may also communicate with the device to-be-charged 20, to exchange charging information (such as voltage information, current information, temperature information, remaining power information, etc. of a battery 213 of the device to-be-charged 20) and determine a charging parameter (such as charging voltage and/or charging current) used for wireless charging.

Those skilled in the art can understand that, the wireless transmitting apparatus 520 may further include other related hardware, logic devices, units, and/or coding for implementing corresponding functions. For example, the wireless transmitting apparatus 520 may further include a displaying unit (such as a light-emitting diode (LED) or an LED display screen). The displaying unit is configured to display in real time a charging status (such as "in charging" or "charging ended") in a wireless charging process. Implementations of the disclosure are not specifically limited in this regard.

In some implementations, as illustrated in FIG. 7, the device to-be-charged 20 includes a receiving coil 210, a first charging unit 211, and a second charging unit 212. The receiving coil 210 includes a first end a, a second end b, and a middle tap c and is configured to receive an electromagnetic signal transmitted by the transmitting coil 523. The first charging unit 211 is coupled with the first end a and the middle tap c of the receiving coil 210 and configured to convert an electromagnetic signal received at the first end a and the middle tap c into a first voltage and a first current for charging the battery 213. The second charging unit 212 is coupled with the second end b and the middle tap c of the receiving coil and configured to convert an electromagnetic signal received at the second end b and the middle tap c into a second voltage and a second current for charging the battery 213.

Here, the first charging unit 211 may include a first AC-DC conversion circuit 211a and a first voltage conversion circuit 211b. The second charging unit 212 may include a second AC-DC conversion circuit 212a and a second voltage conversion circuit 212b. In addition, the device to-be-charged 20 may further include a first control unit 214. The first control unit 214 is configured to control the first AC-DC conversion circuit and the first voltage conversion circuit to work and/or control the second AC-DC conversion circuit and the second voltage conversion circuit to work, according to a charging mode or a charging stage of the battery 213. The charging mode includes a first charging mode and a second charging mode, where a charging speed in the first charging mode is higher than that in the second charging mode. The charging stage of the battery at least includes one of the following charging stages: a trickle charging stage, a constant-current charging stage, and a constant-voltage charging stage.

Those skilled in the art can understand that, the device to-be-charged 20 illustrated in FIG. 7 may further include other related hardware, logic devices, units, and/or coding for implementing corresponding functions. In other words, the structure of the device to-be-charged 20 does not constitute any limitation on a device to-be-charged. The device to-be-charged may include more or fewer components than illustrated or may combine certain components or have different configurations or arrangements of components.

It is to be noted that, power supply device 510 powers the wireless transmitting apparatus 520. The device to-be-charged 20 is placed on a surface of the wireless transmitting apparatus 520. The wireless transmitting apparatus 520 charges the battery 213 of the device to-be-charged 20 through electromagnetic induction. Here, a wireless connection is established between the wireless transmitting apparatus 520 and the device to-be-charged 20, and the wireless transmitting apparatus 520 and the device to-be-charged 20 can also communicate with each other.

In some implementations, the manner of wireless communication includes, but is not limited to, Bluetooth® communication, wireless fidelity (Wi-Fi) communication, high-carrier-frequency based short-distance wireless communication, optical communication, ultrasonic communication, ultra-wideband communication, mobile communication, and the like, and implementations of the disclosure are not specifically limited in this regard.

As such, when the wireless transmitting apparatus 520 transmits an electromagnetic signal via the transmitting coil 523, that is, the wireless transmitting apparatus 520 has an AC power for transmission, a current in one direction will be generated at the receiving coil 210 through electromagnetic induction between the transmitting coil 523 and the receiving coil 210. For example, if an anticlockwise current is generated, for each AC-DC conversion circuit in the device to-be-charged 20, a rectifying bridge included in a rectifying unit of the AC-DC conversion circuit is in a reverse mode. Each rectifying unit will respectively rectify one voltage and then input the rectified voltage into a voltage conversion circuit (such as the first voltage conversion circuit, the second voltage conversion circuit, or a third voltage conversion circuit). Through DC-DC voltage conversion, a charging voltage and/or a charging current expected by the battery 213 of the device to-be-charged 20 is obtained.

For the device to-be-charged 20, the first control unit 214 is further configured to generate feedback information according to at least one of the following charging parameters and feed back the feedback information to the wireless transmitting apparatus 520: a charging voltage across the battery, a charging current of the battery, an output current of the first AC-DC conversion circuit, an output voltage of the first AC-DC conversion circuit, an output current of the second AC-DC conversion circuit, and an output voltage of the second AC-DC conversion circuit. The charging voltage across the battery and the charging current of the battery are used for the wireless transmitting apparatus 520 to determine a transmission power. The output current of the first AC-DC conversion circuit, the output voltage of the first AC-DC conversion circuit, the output current of the second AC-DC conversion circuit, and the output voltage of the second AC-DC conversion circuit are used for the wireless transmitting apparatus 520 to determine a transmission voltage when determining the transmission power.

For the wireless transmitting apparatus 520, the second control unit 524 is further configured to receive the feedback information sent by the first control unit of the device to-be-charged 20, and adjust a transmission power of the wireless transmitting apparatus 520 according to the feedback information.

The following will describe in detail adjustment of the transmission power of the wireless transmitting apparatus 520.

In some implementations, the second control unit 524 is specifically configured to adjust a duty cycle of a switch transistor of the wireless transmitting apparatus according to the feedback information to adjust the transmission power of the wireless transmitting apparatus, or adjust a working frequency of the wireless transmitting apparatus according to the feedback information to adjustment the transmission power of the wireless transmitting apparatus, or adjust a transmission voltage of the wireless transmitting apparatus according to the feedback information to adjust the transmission power of the wireless transmitting apparatus.

It is to be noted that, based on communication between the wireless transmitting apparatus 520 and the device to-be-charged 20, if the transmission power of the wireless transmitting apparatus 520 does not match a charging power required by the battery of the device to-be-charged 20, the wireless transmitting apparatus 520 can adjust the transmission power of the wireless transmitting apparatus according to the feedback information received, such that the transmission power of the wireless transmitting apparatus matches the charging power required by the battery of the device to-be-charged. Alternatively, if an output current of the receiving coil of the device to-be-charged does not match a preset current range, the wireless transmitting apparatus can also adjust the transmission power of the wireless transmitting apparatus according to the feedback information received, such that the output current of the receiving coil of the device to-be-charged matches the preset current range. In this way, by adjusting the transmission power, the transmission power of the wireless transmitting apparatus can match the charging power required by the battery of the device to-be-charged, and the output current of the receiving coil of the device to-be-charged can match the preset current range, which is possible to reduce heat generation of the device to-be-charged during charging, thereby improving charging efficiency.

It is to be further noted that, in connection with the wireless charging system illustrated in FIG. 7, the wireless transmitting apparatus 520 includes a voltage conversion unit (such as the fourth voltage conversion circuit 521 illustrated in FIG. 7), which can control adjustment of the transmission voltage of the wireless transmitting apparatus 520 according to the feedback information. Specifically, the second control unit 524 can control the fourth voltage conversion circuit 521 to make an output voltage of the fourth voltage conversion circuit 521 vary, thereby adjusting the transmission voltage. Alternatively, the second control unit 524 can adjust an input voltage of the fourth voltage conversion circuit 521 (for example, adjust the output voltage of the power supply device 510 illustrated in FIG. 7) to make the output voltage of the fourth voltage conversion circuit 521 vary, thereby adjusting the transmission voltage. As such, the transmission power can be adjusted. Besides, the second control unit 524 (or the inverse rectification control unit 525) may also adjust a duty cycle of a switch transistor of the inverse rectifying circuit 522, or the second control unit 524 may even adjust a working frequency of a resonant circuit of the wireless transmitting apparatus 520, which can also adjust the transmission power. This can be set according to actual needs in practice, and implementations of the disclosure are not specifically limited in this regard.

Specifically, based on communication between the device to-be-charged 20 and the wireless transmitting apparatus 520, in some implementations, the first control unit 214 is configured to determine a required charging power according to the charging voltage across the battery and/or the charging current of the battery, and feed back the required charging power to the wireless transmitting apparatus. The second control unit 524 is configured to receive the required charging power, and control adjustment of the transmission power the wireless transmitting apparatus according to the required charging power, such that an adjusted transmission power matches a required charging power of the battery of the device to-be-charged.

In some implementations, the first control unit 214 is configured to determine a required current according to the output current and/or the output voltage of the first AC-DC conversion circuit, and/or according to the output current and/or the output voltage of the second AC-DC conversion circuit, and feed back the required current to the wireless transmitting apparatus. The second control unit 524 is configured to receive the required current, and control adjustment of the transmission power the wireless transmitting apparatus according to the required current, such that an output current of the receiving coil of the device to-be-charged matches the preset current range.

In some implementations, the first control unit 214 is configured to determine a required charging power according to the charging voltage across the battery and/or the charging current of the battery, and determine a required current according to the output current and/or the output voltage of the first AC-DC conversion circuit, and/or according to the output current and/or the output voltage of the second AC-DC conversion circuit. The first control unit 214 is further configured to determine a required voltage according to the required charging power and the required current, and feed back the required voltage to the wireless transmitting apparatus. The second control unit 524 is configured to receive the required voltage, and control adjustment of the transmission power of the wireless transmitting apparatus according to the required voltage, such that an adjusted transmission power matches a required charging power of the battery of the device to-be-charged and an output current of the receiving coil of the device to-be-charged matches the preset current range.

In some implementations, the first control unit 214 is further configured to, after determining the required voltage, compare the required voltage with an output voltage of the first AC-DC conversion circuit and/or an output voltage of the second AC-DC conversion circuit that is currently received, to determine a voltage difference. The first control unit 214 is further configured to feed back the voltage difference to the wireless transmitting apparatus. The second control unit 524 is further configured to receive the voltage difference, and control adjustment of the transmission power of the wireless transmitting apparatus according to the voltage difference, such that an adjusted transmission power matches a required charging power of the battery of the device to-be-charged and an output current of the receiving coil of the device to-be-charged matches the preset current range.

In some implementations, the first control unit 214 is further configured to send to the wireless transmitting apparatus feedback information indicating to increase a transmission voltage or decrease a transmission voltage. The second control unit 524 is further configured to receive the feedback information indicating to increase a transmission voltage or decrease a transmission voltage, and adjust the transmission voltage to control adjustment of the transmission power of the wireless transmitting apparatus, such that an adjusted transmission power matches a required charging power of the battery of the device to-be-charged and an output current of the receiving coil of the device to-be-charged matches the preset current range.

In some implementations, the first control unit 214 is further configured to detect a temperature of the battery, and send a first instruction to the wireless transmitting apparatus when the detected temperature of the battery is higher than a temperature threshold and lower than a preset temperature value. The second control unit 524 is further configured to receive the first instruction, and adjust the transmission power of the wireless transmitting apparatus according to the first instruction, to reduce the temperature of the battery of the device to-be-charged.

In some implementations, the first control unit 214 is further configured to detect a charging status of the device to-be-charged, and send a second instruction to the wireless transmitting apparatus when the charging status is an abnormal charging status. The abnormal charging status includes: a remaining power of the battery is higher than a preset power value, and/or the temperature of the battery is higher than the preset temperature value, and/or the charging voltage across the battery is higher than a preset voltage value, and/or the charging current of the battery is higher than a preset current value. The second control unit 524 is further configured to receive the second instruction, and control, according to the second instruction, the wireless transmitting apparatus to stop transmitting an electromagnetic signal, so as to stop providing a transmission power to the device to-be-charged.

In some implementations, the first control unit 214 is further configured to obtain a maximum transmission power of the wireless transmitting apparatus, and when the obtained maximum transmission power is lower than a preset power threshold, control the first charging unit to work and control the second charging unit not to work. The first voltage conversion circuit at least is one of: a buck circuit, a charging IC, or an integrated circuit of a charge pump circuit and a charging IC. Alternatively, the first control unit 214 is configured to control the second charging unit to work and control the first charging unit not to work, when the obtained maximum transmission power is lower than the preset power threshold. The second voltage conversion circuit at least is one of: a buck circuit, a charging IC, or an integrated circuit of a charge pump circuit and a charging IC.

Implementations provide a wireless charging system. The wireless charging system includes the power supply device, the wireless transmitting apparatus, and the device to-be-charged. The power supply device powers the wireless transmitting apparatus, and the wireless transmitting apparatus charges the battery of the device to-be-charged. During charging of the device to-be-charged, the device to-be-charged is placed on a surface of the wireless transmitting apparatus, and energy is transferred therebetween through electromagnetic induction to charge the battery of the device to-be-charged. Since a tap is adopted in the receiving coil of the device to-be-charged, multiple charging paths can be formed and the battery can be charged through each charging path, which is possible to increase a charging power of the device to-be-charged. In addition, since there are multiple charging paths, a charging power of each charging path can be reduced. In this way, heating spots can be dispersed and heating during charging can be reduced, which can improve charging efficiency.

Figure 8:
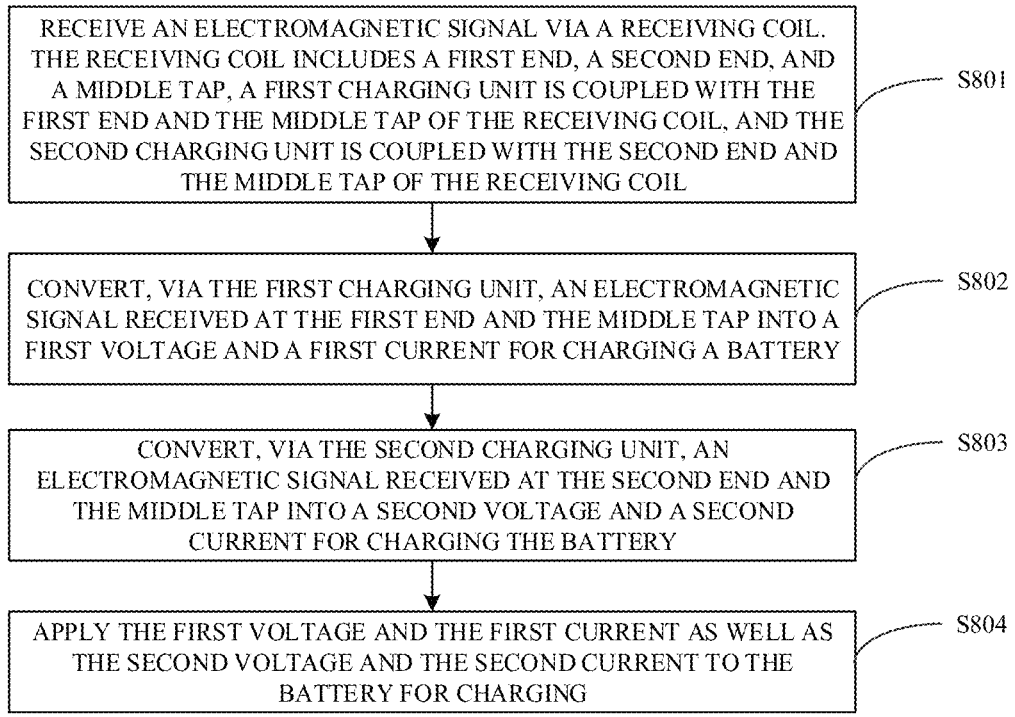
FIG. 8 is a schematic flowchart of a wireless charging method provided in implementations of the disclosure.

Based on the wireless charging system illustrated in FIG. 7, refer to FIG. 8, which is a schematic flowchart of a wireless charging method provided in implementations of the disclosure. As illustrated in FIG. 8, the method includes the following.

S801, an electromagnetic signal is received via a receiving coil. The receiving coil includes a first end, a second end, and a middle tap. A first charging unit is coupled with the first end and the middle tap of the receiving coil. A second charging unit is coupled with the second end and the middle tap of the receiving coil.

S802, via the first charging unit, an electromagnetic signal received at the first end and the middle tap is converted into a first voltage and a first current for charging a battery.

S803, via the second charging unit, an electromagnetic signal received at the second end and the middle tap is converted into a second voltage and a second current for charging the battery.

S804, the first voltage and the first current as well as the second voltage and the second current are applied to the battery for charging.

It is to be noted that, the method is applicable to a device to-be-charged described in any of the foregoing implementations. In the device to-be-charged, the receiving coil has one center tap. Through the center tap, an electromagnetic signal received can be divided into two electromagnetic signals, and the two electromagnetic signals are respectively inputted into the first charging unit and the second charging unit to form two charging paths.

In implementations of the disclosure, since a tap is adopted in the receiving coil of the device to-be-charged, multiple charging paths can be formed and the battery can be charged through each charging path, which is possible to increase a charging power of the device to-be-charged. In addition, since there are multiple charging paths, a charging power of each charging path can be reduced. In this way, heating spots can be dispersed and heating during charging can be reduced, which can improve charging efficiency.

In some implementations, the method may further include the following. The first charging unit and/or the second charging unit is controlled to work via a first control unit according to a charging mode or a charging stage of the battery to charge the battery. The charging mode includes a first charging mode and a second charging mode, where a charging speed in the first charging mode is higher than that in the second charging mode. The charging stage of the battery at least includes one of the following charging stages: a trickle charging stage, a constant-current charging stage, and a constant-voltage charging stage.

In addition, the first charging unit includes a first AC-DC conversion circuit and a first voltage conversion circuit. The second charging unit includes a second AC-DC conversion circuit and a second voltage conversion circuit. The first charging unit and/or the second charging unit is controlled to work via the first control unit according to the charging mode or the charging stage of the battery as follows. Via the first control unit, the first AC-DC conversion circuit and the first voltage conversion circuit are controlled to work and/or the second AC-DC conversion circuit and the second voltage conversion circuit are controlled to work, according to the charging mode or the charging stage of the battery.

It is to be noted that, the first AC-DC conversion circuit or the second AC-DC conversion circuit can perform AC-DC voltage conversion on a corresponding electromagnetic signal received from the receiving coil to obtain a DC voltage and a DC current. The first voltage conversion circuit or the second voltage conversion circuit can perform DC-DC voltage conversion on the DC voltage and the DC current to obtain an output voltage and an output current of a corresponding charging unit, for example, the first voltage and the first current outputted by the first charging unit as well as the second voltage and the second current outputted by the second charging unit. Then the first voltage and the first current as well as the second voltage and the second current are applied to the battery for charging.

It is to be further noted that, the first control unit may be a separate MCU of the device to-be-charged, and as such, it is possible to improve reliability in control. In some implementations, the first control unit may also be an AP of the device to-be-charged, and as such, it is possible to save hardware cost. Implementations of the disclosure are not specifically limited in this regard.

In addition, in some implementations, the first voltage conversion circuit is a buck circuit, a charging IC, or a buck-boost circuit. The method further includes the following. Via the first control unit, the first voltage conversion circuit is controlled to work in one or more of the following charging stages: the trickle charging stage, the constant-current charging stage, and the constant-voltage charging stage.

In addition, in some implementations, the second voltage conversion circuit is a charge pump circuit. The method further includes the following. Via the first control unit, the second voltage conversion circuit is controlled to work in the constant-current charging stage.

In addition, in some implementations, the first voltage conversion circuit and the second voltage conversion circuit each are a charge pump circuit. The device to-be-charged further includes a third voltage conversion circuit. The method further includes the following. Via the first control unit, the first voltage conversion circuit and the second voltage conversion circuit are controlled to work when the battery is in the constant-current charging stage. Via the first control unit, the third voltage conversion circuit is controlled to work when the battery is in the trickle charging stage and/or the constant-voltage charging stage.

It is to be noted that, the first voltage conversion circuit and the second voltage conversion circuit each may be a charge pump circuit. The third voltage conversion circuit may be a charging IC, a buck circuit, or a buck-boost circuit. The first voltage conversion circuit may realize DC-DC conversion on a voltage and a current outputted by the first AC-DC conversion circuit, such that the first voltage and the first current outputted by the first charging unit can be directly applied to the battery. The second voltage conversion circuit may realize DC-DC conversion on a voltage and a current outputted by the second AC-DC conversion circuit, such that the second voltage and the second current outputted by the second charging unit can be directly applied to the battery. The third voltage conversion circuit can also realize DC-DC conversion on the voltage and the current outputted by the first AC-DC conversion circuit and/or implementing DC-DC conversion on the voltage and the current outputted by the second AC-DC conversion circuit, such that a third voltage and a third current outputted through this charging path can be directly applied to the battery.

It is to be further noted, the charging stage of the battery of the device to-be-charged may include the trickle charging stage, the constant-current charging stage, and the constant-voltage charging stage. The first voltage conversion circuit and the second voltage conversion circuit usually work in the constant-current charging stage, and the third voltage conversion circuit usually works in the trickle charging stage and/or the constant-voltage charging stage.

In some implementations, the device to-be-charged may further include a fourth voltage conversion circuit and a fifth voltage conversion circuit. The method further includes the following. Via the first control unit, the fourth voltage conversion circuit is controlled to work when the battery is in the constant-current charging stage. Via the first control unit, the fifth voltage conversion circuit is controlled to work when the battery is in the trickle charging stage and/or the constant-voltage charging stage.

It is to be noted that, the fourth voltage conversion circuit is a charge pump circuit, and the fifth voltage conversion circuit is a charging IC, a buck circuit, or a buck-boost circuit. Take FIG. 4 as an example. In FIG. 4, the fourth voltage conversion circuit 401 is coupled with both the first AC-DC conversion circuit 211*a* and the second AC-DC conversion circuit 212*a*. In this case, in the constant-current charging stage, the battery 213 is charged via the fourth voltage conversion circuit 401 through two charging paths simultaneously. In FIG. 4, the fifth voltage conversion circuit 402 is coupled with both the first AC-DC conversion circuit 211*a* and the second AC-DC conversion circuit 212*a*. In this case, in the trickle charging stage and/or the constant-voltage charging stage, the battery 213 is charged via the fifth voltage conversion circuit 402 through two charging paths simultaneously.

Besides, the fifth voltage conversion circuit 402 may also be coupled with only one AC-DC conversion circuit (the first AC-DC conversion circuit 211*a* or the second AC-DC conversion circuit 212*a*). In this case, in the trickle charging stage and/or the constant-voltage charging stage, and the battery 213 is charged via the fifth voltage conversion circuit 402 through only one charging path. In other words, when the fifth voltage conversion circuit 402 is coupled with only the first AC-DC conversion circuit 211*a*, in the trickle charging stage and/or the constant-voltage charging stage, the battery 213 is charged via the first AC-DC conversion circuit 211*a* and the fifth voltage conversion circuit 402 through a first charging path. When the fifth voltage conversion circuit 402 is coupled only with the second AC-DC conversion circuit 212*a*, in the trickle charging stage and/or the constant-voltage charging stage, the battery 213 is charged via the second AC-DC conversion circuit 212*a* and the fifth voltage conversion circuit 402 through a second charging path.

In some implementations, the device to-be-charged may further include a first communicating unit. Before receiving an electromagnetic signal via the receiving coil at S801, the method may further include the following. Handshake communication is established with a wireless transmitting apparatus through the first communicating unit. If the handshake communication is successfully established, the wireless transmitting apparatus is controlled to provide a transmission power to the device to-be-charged to charge the battery.

It is to be noted that, before charging of the device to-be-charged, the device to-be-charged and the wireless transmitting apparatus need be capable of communicating a charging handshake protocol, to establish handshake communication between the device to-be-charged and the wireless transmitting apparatus. If handshake communication is successfully established, the wireless transmitting apparatus can be controlled to provide a transmission power to the device to-be-charged to charge. Here, the transmission power provided to the device to-be-charged by the wireless transmitting apparatus is converted into an electromagnetic signal via a transmitting coil for transmission to the outside. Then the electromagnetic signal is received by the receiving coil.

As such, based on communication between the device to-be-charged and the wireless transmitting apparatus, in some implementations, the method may further include the following. Feedback information is generated via the first control unit according to at least one of the following charging parameters and the feedback information is fed back to the wireless transmitting apparatus. The charging parameter includes: a charging voltage across the battery, a charging current of the battery, an output current of the first AC-DC conversion circuit, an output voltage of the first AC-DC conversion circuit, an output current of the second AC-DC conversion circuit, and an output voltage of the second AC-DC conversion circuit.

It is to be noted that, the charging voltage across the battery and the charging current of the battery are used for the wireless transmitting apparatus to determine a transmission power. The output current of the first AC-DC conversion circuit, the output voltage of the first AC-DC conversion circuit, the output current of the second AC-DC conversion circuit, and the output voltage of the second AC-DC conversion circuit are used for the wireless transmitting apparatus to determine a transmission voltage when determining the transmission power.

In addition, if only charging power is considered, in some implementations, the feedback information may be fed back to the wireless transmitting apparatus as follows. A required charging power is determined according to the charging voltage across the battery and/or the charging current of the battery. The required charging power is fed back to the wireless transmitting apparatus as the feedback information, to make the wireless transmitting apparatus adjust a transmission power of an electromagnetic signal according to the required charging power.

In addition, if only heating of the receiving coil is considered, in some implementations, the feedback information may be fed back to the wireless transmitting apparatus as follows. A required current is determined according to an output current and/or an output voltage of the first AC-DC conversion circuit, and/or according to an output current and/or an output voltage of the second AC-DC conversion circuit. The required current is fed back to the wireless transmitting apparatus as the feedback information, to make the wireless transmitting apparatus adjust a transmission power of an electromagnetic signal according to the required current.

In addition, if both charging power and heating of the receiving coil are considered, in some implementations, the feedback information may be fed back to the wireless transmitting apparatus as follows. A required charging power is determined according to the charging voltage across the battery and/or the charging current of the battery. A required current is determined according to the output current and/or the output voltage of the first AC-DC conversion circuit, and/or according to the output current and/or the output voltage of the second AC-DC conversion circuit. A required voltage is determined according to the required charging power and the required current. The required voltage is fed back to the wireless transmitting apparatus as the feedback information, to make the wireless transmitting apparatus adjust a transmission power of an electromagnetic signal according to the required voltage.

In addition, if both charging power and heating of the receiving coil are considered, the method may further include the following after determining the required voltage. According to the required voltage determined, the required voltage is compared with an output voltage of the first AC-DC conversion circuit and/or an output voltage of the second AC-DC conversion circuit that is currently received, to determine a voltage difference. The voltage difference is fed back to the wireless transmitting apparatus as the feedback information, to make the wireless transmitting apparatus adjust a transmission power of an electromagnetic signal according to the voltage difference.

It is to be noted that, at a device to-be-charged 20 side, when both charging power and heating of the receiving coil are considered, after obtaining the required voltage, if the required voltage is obtained according to the first charging path, the required voltage can be compared with the currently received output voltage of the first AC-DC conversion circuit 211*a* to determine the voltage difference; if the required voltage is obtained according to the second charging path, the required voltage can be compared with the currently received output voltage of the second AC-DC conversion circuit 212*a* to determine the voltage difference. Then the determined voltage difference is sent to the wireless transmitting apparatus, such that the wireless transmitting apparatus can adjust the transmission power.

It is to be further noted that, at the device to-be-charged 20 side, whether to increase or decrease a transmission voltage can be determined according to at least one of the following charging parameters obtained: the output current of the first AC-DC conversion circuit 211*a*, the output voltage of the first AC-DC conversion circuit 211*a*, the output current of the second AC-DC conversion circuit 212*a*, and the output voltage of the second AC-DC conversion circuit 212*a*. In this situation, feedback information indicating to increase the transmission voltage or decrease the transmission voltage can be generated and then sent to the wireless transmitting apparatus for adjustment of the transmission voltage, such that the wireless transmitting apparatus can adjust the transmission power.

In some implementations, the method may further include the following. A temperature of the battery is detected. A first instruction is sent to the wireless transmitting apparatus when the detected temperature of the battery is higher than a temperature threshold and lower than a preset temperature value, where the first instruction in used for instructing the wireless transmitting apparatus to adjust a transmission power of an electromagnetic signal.

It is to be noted that, the temperature of the battery can be detected through a temperature sensor. It is also possible to detect a temperature of the receiving coil or even a temperature of a housing of the device to-be-charged, and implementations of the disclosure are not specifically limited in this regard. Take detection of the temperature of the battery as an example. The detected temperature is compared with the temperature threshold. If the detected temperature is higher than the temperature threshold, it indicates that the temperature is excessively high. In this case, a charging power of the device to-be-charged can be reduced, that is, the first instruction is sent to the wireless transmitting apparatus, where the first instruction is used for instructing the wireless transmitting apparatus to adjust the transmission power of the electromagnetic signal, thereby reducing the temperature of the battery of the device to-be-charged.

In some implementations, the method may further include the following. A charging status of the device to-be-charged is detected. A second instruction is sent to the wireless transmitting apparatus when the charging status is an abnormal charging status. The second instruction is used for instructing the wireless transmitting apparatus to stop transmitting an electromagnetic signal, so as to stop providing a transmission power to the device to-be-charged. The abnormal charging status includes: a remaining power of the battery is higher than a preset power value, and/or the temperature of the battery is higher than the preset temperature value, and/or the charging voltage across the battery is higher than a preset voltage value, and/or the charging current of the battery is higher than a preset current value.

Take the abnormal charging status that the remaining power of the battery is higher than the preset power value as an example. During charging of the device to-be-charged, the first control unit 214 can also detect the remaining power of the battery 213 and then determine, according to the remaining power detected, whether to continue controlling the wireless transmitting apparatus to provide a transmission power to the device to-be-charged to charge. In other words, the remaining power detected is compared with a preset power threshold. If the remaining power detected is higher than the preset power threshold, it indicates that the battery is fully charged. In this case, the charging status is the abnormal charging status, and it is necessary to send the second instruction to the wireless transmitting apparatus, where the second instruction is used for instructing the wireless transmitting apparatus to stop transmitting an electromagnetic signal (that is, to disable signal transmission of the transmitting coil), so as to stop providing a transmission power to the device to-be-charged, thereby stopping charging the battery of the device to-be-charged. In addition, if the remaining power detected is lower than the preset power threshold, it indicates that the battery is not yet fully charged. In this case, the charging status is a normal charging status, and a third instruction can be sent to the wireless transmitting apparatus, where the third instruction is used for instructing the wireless transmitting apparatus to continue providing a transmission power to the device to-be-charged, so as to continue charging the battery of the device to-be-charged.

In some implementations, the method may further include the following. A maximum transmission power of the wireless transmitting apparatus is obtained. Via the first control unit, the first charging unit or the second charging unit is controlled to work when the obtained maximum transmission power is lower than a preset power threshold.

It is to be noted that, after obtaining the maximum transmission power of the wireless transmitting apparatus, if the obtained maximum transmission power is lower than the preset power threshold, control the first charging unit to work and control the second charging unit not to work via the first control unit, where the first voltage conversion circuit is at least one of the following: a buck circuit, a charging IC, or an integrated circuit of a charge pump circuit and a charging IC. Alternatively, if the obtained maximum transmission power is lower than the preset power threshold, control the second charging unit to work and control the first charging unit not to work via the first control unit, where the second voltage conversion circuit is at least one of the following: a buck circuit, a charging IC, or an integrated circuit of a charge pump circuit and a charging IC.

It is to be further noted that, since a tap is adopted in the receiving coil, multiple charging units can be obtained. However, among the multiple charging units, only one charging unit works at a certain time. For example, if a maximum transmission power that can be provided by the wireless transmitting apparatus is lower than the preset power threshold (such as 15 W), only the first charging unit or the second charging unit is controlled to work. It is to be noted that, for a working charging unit, a voltage conversion circuit included in the charging unit may be a buck circuit, or may be a charging IC, or may be an integrated circuit of a charge pump circuit and a charging IC, and implementations of the disclosure are not specifically limited in this regard.

In some implementations, the battery may include a single cell, or may include multiple cells. When the battery includes multiple cells, the multiple cells may include a multi-cell series structure and a multi-cell parallel structure. Therefore, in some implementations, when the battery has the multi-cell parallel structure, the method may further include the following. A $k^{th}$ charging unit of multiple charging units is controlled to charge a $k^{th}$ cell of the battery, where the $k^{th}$ cell is coupled with the $k^{th}$ charging unit of the multiple charging units, and k is a positive integer and $1 \leq k \leq N+1$.

It is to be noted that, when the receiving coil has one center tap, the multiple charging units include a first charging unit and a second charging unit. Supposing that the battery is a dual-cell parallel structure, it is possible that the first charging unit charges a first cell and the second charging unit charges a second cell. When the receiving coil has multiple taps, taking the device to-be-charged 20 illustrated in FIG. 6 as an example, in FIG. 6, the battery 213 includes cell 1, cell 2, . . . , cell N+1, where cell 1, cell 2, . . . , cell N+1 are connected in parallel. A first voltage conversion circuit in a first charging path is coupled with cell 1, a second voltage conversion circuit in a second charging path is coupled with cell 2, . . . , an $(N+1)^{th}$ voltage conversion circuit in an $(N+1)^{th}$ charging path is coupled with cell N+1. As such, cell 1 can be charged through the first charging path, cell 2 can be charged through the second charging path, and cell N+1 can be charged through the $(N+1)^{th}$ charging path, which is possible to increase charging speed.

In addition, in order to ensure charging speed and further reduce heating of the device to-be-charged 20, the battery 213 of the device to-be-charged 20 may also have the multi-cell series structure, that is, multiple cells (such as cell 1, cell 2, . . . , cell N+1) are in series. Compared with a single-cell scheme, to achieve an equal charging speed, a charging current required by the multi-cell series structure is 1/K time a charging current required by a single cell (K is the number of cells coupled in series in the device to-be-charged 20). In other words, under the same charging speed, by adopting this implementation of the disclosure, it is possible to substantially decrease a charging current, thereby further decreasing the amount of heat generated by the device to-be-charged 20 during charging.

Implementations provide a wireless charging method. The method is applicable to a device to-be-charged. An electromagnetic signal is received via the receiving coil. The receiving coil includes the first end, the second end, and the middle tap. The first charging unit is coupled with the first end and the middle tap of the receiving coil. The second charging unit is coupled with the second end and the middle tap of the receiving coil. Via the first charging unit, the electromagnetic signal received at the first end and the middle tap is converted into the first voltage and the first current for charging the battery. Via the second charging unit, the electromagnetic signal received at the second end and the middle tap is converted into the second voltage and the second current for charging the battery. The first voltage and the first current as well as the second voltage and the second current are applied to the battery for charging. Here, a tap is adopted in the receiving coil. Through at least one tap, an electromagnetic signal received is divided into at least two electromagnetic signals, and each of the at least two electromagnetic signals is respectively inputted into each charging unit, which can form at least two charging paths, thereby increasing a charging power of the device to-be-charged. In addition, since there are multiple charging paths, a charging power of each charging path can be reduced. In this way, heating spots can be dispersed and heating during charging can be reduced, which can improve charging efficiency.

Figure 9:
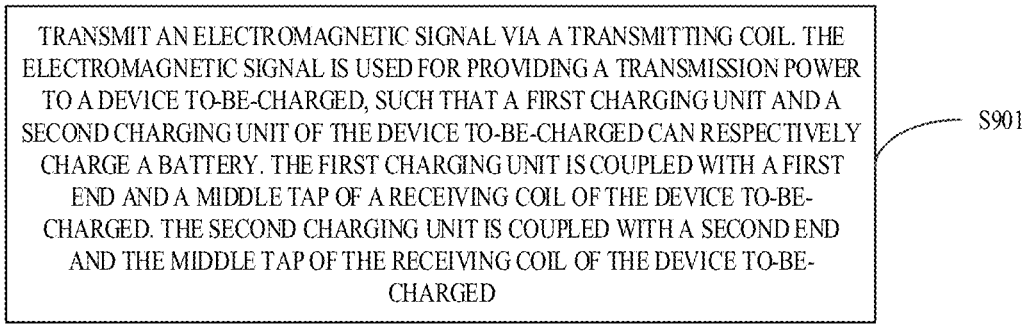
FIG. 9 is a schematic flowchart of another wireless charging method provided in implementations of the disclosure.

Based on the wireless charging system illustrated in FIG. 7, refer to FIG. 9, which is a schematic flowchart of a wireless charging method provided in implementations of the disclosure. As illustrated in FIG. 9, the method includes the following.

S901, an electromagnetic signal is transmitted via a transmitting coil. The electromagnetic signal is used for providing a transmission power to a device to-be-charged, such that a first charging unit and a second charging unit of the device to-be-charged can respectively charge a battery. The first charging unit is coupled with a first end and a middle tap of a receiving coil of the device to-be-charged.

The second charging unit is coupled with a second end and the middle tap of the receiving coil of the device to-be-charged.

It is to be noted that, the wireless charging method is applicable to a wireless transmitting apparatus described in any of the foregoing implementations. The wireless transmitting apparatus at least includes the transmitting coil. The transmitting coil can generate electromagnetic induction with the receiving coil of the device to-be-charged.

In implementations of the disclosure, the wireless transmitting apparatus transmits an electromagnetic signal via the transmitting coil, and can provide a transmission power to the device to-be-charged through electromagnetic induction between the transmitting coil and the receiving coil, such that the first charging unit and the second charging unit of device to-be-charged can respectively charge the battery. The first charging unit is coupled with the first end and the middle tap of the receiving coil of the device to-be-charged, to form a first charging path. The second charging unit is coupled with the second end and the middle tap of the receiving coil of the device to-be-charged, to form a second charging path. As such, since a tap is adopted in the receiving coil of the device to-be-charged, multiple charging paths can be formed and the battery can be charged through each charging path, which is possible to increase a charging power of the device to-be-charged.

In some implementations, the wireless transmitting apparatus may include a second communicating unit. Before transmitting the electromagnetic signal via the transmitting coil at S901, the method may further include the following. Handshake communication is established with the device to-be-charged via the second communicating unit. When the handshake communication is successfully established, the wireless transmitting apparatus is controlled to provide a transmission power to the device to-be-charged to charge the battery.

It is to be noted that, before charging of the device to-be-charged, the device to-be-charged and the wireless transmitting apparatus need be capable of communicating a charging handshake protocol, to establish handshake communication between the device to-be-charged and the wireless transmitting apparatus. If handshake communication is successfully established, the wireless transmitting apparatus can be controlled to provide a transmission power to the device to-be-charged to charge. Here, the transmission power provided to the device to-be-charged by the wireless transmitting apparatus is converted into an electromagnetic signal via the transmitting coil for transmission to the outside. Then the electromagnetic signal is received by the receiving coil.

It is to be further noted that, the second communicating unit may be a separate unit or module, or may be integrated into a second control unit of the wireless transmitting apparatus, or may even be integrated into an inverse rectification control unit, and implementations of the disclosure are not specifically limited in this regard.

As such, based on communication between the wireless transmitting apparatus and the device to-be-charged, the device to-be-charged can send feedback information to the wireless transmitting apparatus. Then the wireless transmitting apparatus adjusts a transmission power of an electromagnetic signal according to the feedback information received. The feedback information at least includes one of the following: a charging voltage across the battery, a charging current of the battery, an output current of a first AC-DC conversion circuit, an output voltage of the first AC-DC conversion circuit, an output current of a second AC-DC conversion circuit, and an output voltage of the second AC-DC conversion circuit. The charging voltage across the battery and the charging current of the battery are used for the wireless transmitting apparatus to determine a transmission power. The output current of the first AC-DC conversion circuit, the output voltage of the first AC-DC conversion circuit, the output current of the second AC-DC conversion circuit, and the output voltage of the second AC-DC conversion circuit are used for the wireless transmitting apparatus to determine a transmission voltage when determining the transmission power.

Implementations provide a wireless charging method. The method is applicable to a wireless transmitting apparatus. An electromagnetic signal is transmitted via the transmitting coil. The electromagnetic signal is used for providing a transmission power to the device to-be-charged, such that the first charging unit and the second charging unit of the device to-be-charged can respectively charge the battery. The first charging unit is coupled with the first end and the middle tap of the receiving coil of the device to-be-charged. The second charging unit is coupled with the second end and the middle tap of the receiving coil of the device to-be-charged. As such, since a tap is adopted in the receiving coil of the device to-be-charged, it is possible not only to enlarge a coil but also to increase charging paths, thereby increasing a charging power of the device to-be-charged. In addition, since there are multiple charging paths, a charging power of each charging path can be reduced. In this way, heating spots can be dispersed and heating during charging can be reduced, which can improve charging efficiency.

It can be understood that, in implementations of the disclosure, a "unit" may be a part of circuit, a part of processor, a part of program or software, etc., and may also be a module or may be non-modular. In addition, various parts in implementations may be integrated into one processing unit or may be present as a number of physically separated units, and two or more units may be integrated into one. The integrated unit may take the form of hardware or a software functional module.

If the integrated units are implemented as software functional modules and sold or used as standalone products, they may be stored in a computer readable storage medium. Based on such an understanding, the essential technical solution of implementations of the disclosure, or the portion that contributes to the prior art, or all or part of the technical solution may be embodied as software products. The computer software products can be stored in a storage medium and may include multiple instructions that, when executed, can cause a computing device, e.g., a personal computer, a server, a network device, etc., or a processor to execute some or all operations of the methods described in implementations. The above storage medium may include various kinds of media that can store program codes, such as a USB flash disk, a mobile hard drive, a read only memory (ROM), a random access memory (RAM), a magnetic disk, or an optical disk.

Therefore, implementations provide a computer storage medium. The computer storage medium is configured to store programs for wireless charging which, when executed by a device to-be-charged, are operable with the device to-be-charged to perform the wireless charging method described in any of the foregoing implementations.

Specifically, in implementations of the disclosure, programs or instructions corresponding to the wireless charging method may be stored in a storage medium such as an optical disk, a hard drive, a USB flash disk, etc. The programs corresponding to the wireless charging method in the storage medium, when read or executed by the device to-be-charged, include the following. A receiving coil includes a first end, a second end, and a middle tap. A first charging unit is coupled with the first end and the middle tap of the receiving coil and configured to convert an electromagnetic signal received at the first end and the middle tap into a first voltage and a first current for charging a battery. A second charging unit is coupled with the second end and the middle tap of the receiving coil and configured to convert an electromagnetic signal received at the second end and the middle tap into a second voltage and a second current for charging the battery.

In addition, implementations of the disclosure further provide another computer storage medium. The computer storage medium is configured to store programs for wireless charging which, when executed by a wireless transmitting apparatus, are operable with the wireless transmitting apparatus to perform the wireless charging method described in any of the foregoing implementations.

Specifically, in implementations of the disclosure, programs or instructions corresponding to the wireless charging method may be stored in a storage medium such as an optical disk, a hard drive, a USB flash disk, etc. The programs corresponding to the wireless charging method in the storage medium, when read or executed by the wireless transmitting apparatus, include the following. An electromagnetic signal is transmitted via a transmitting coil. The electromagnetic signal is used for providing a transmission power to a device to-be-charged, such that a first charging unit and a second charging unit of the device to-be-charged can respectively charge a battery. The first charging unit is coupled with a first end and a middle tap of a receiving coil of the device to-be-charged. The second charging unit is coupled with a second end and the middle tap of the receiving coil of the device to-be-charged.

It is to be noted that, in implementations of the disclosure, the terms "include", "contain" as well as variations thereof are intended to cover non-exclusive inclusion, such that a process, method, object, or apparatus including a series of elements is not limited to the listed elements, on the contrary, it can optionally include other elements that are not specifically listed; alternatively, other elements inherent to the process, method, object, or apparatus can be also included. Without further limitation, an element qualified by the phrase "including a . . . " does not exclude the presence of additional identical elements in a process, method, object, or apparatus that includes the element.

The sequential numbers in the foregoing implementations of the disclosure are only for description, and do not represent superiority or inferiority of the implementations.

The methods disclosed in the method implementations provided in the disclosure can be arbitrarily combined without conflict, to obtain a new method implementation.

The features disclosed in the product implementations provided in the disclosure can be arbitrarily combined without conflict, to obtain a new product implementation.

The features disclosed in the method or device implementations provided in the disclosure may be combined arbitrarily without conflict, to obtain a new method implementation or device implementation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

In implementations of the disclosure, a device to-be-charged includes a receiving coil, a first charging unit, and a second charging unit. The receiving coil includes a first end, a second end, and a middle tap. The first charging unit is coupled with the first end and the middle tap of the receiving coil and configured to convert an electromagnetic signal received at the first end and the middle tap into a first voltage and a first current for charging a battery. The second charging unit is coupled with the second end and the middle tap of the receiving coil and configured to convert an electromagnetic signal received at the second end and the middle tap into a second voltage and a second current for charging the battery. As such, since a tap is adopted in the receiving coil, multiple charging paths can be formed and the battery can be charged through each charging path, which is possible to increase a charging power of the device to-be-charged. In addition, since there are multiple charging paths, a charging power of each charging path can be reduced. In this way, heating spots can be dispersed and heating during charging can be reduced, which also improves charging efficiency.

What is claimed is:

1. A device to-be-charged, comprising:
a receiving coil comprising a first end, a second end, and a middle tap;
a first charging unit coupled with the first end and the middle tap of the receiving coil and configured to convert an electromagnetic signal received at the first end and the middle tap into a first voltage and a first current for charging a battery;
a second charging unit coupled with the second end and the middle tap of the receiving coil and configured to convert an electromagnetic signal received at the second end and the middle tap into a second voltage and a second current for charging the battery; and
a first control unit configured to control the first charging unit and/or the second charging unit to work according to a charging mode or a charging stage of the battery to charge the battery;
wherein the charging mode comprises a first charging mode and a second charging mode, wherein a charging speed in the first charging mode is higher than that in the second charging mode; and
wherein the charging stage of the battery at least comprises one of the following charging stages: a trickle charging stage, a constant-current charging stage, and a constant-voltage charging stage.

2. The device to-be-charged of claim 1, wherein
the first charging unit comprises a first alternating current (AC)-direct current (DC) conversion circuit and a first voltage conversion circuit;
the second charging unit comprises a second AC-DC conversion circuit and a second voltage conversion circuit;
the first control unit is configured to control the first AC-DC conversion circuit and the first voltage conversion circuit to work and/or control the second AC-DC conversion circuit and the second voltage conversion circuit to work, according to the charging mode or the charging stage of the battery.

3. The device to-be-charged of claim 2, wherein the first control unit is configured to control the first voltage conversion circuit to work in one or more of the following charging stages: the trickle charging stage, the constant-current charging stage, and the constant-voltage charging stage, and control the second voltage conversion circuit to work in the constant-current charging stage.

4. The device to-be-charged of claim 2, wherein the device to-be-charged further comprises:
a third voltage conversion circuit coupled with the first AC-DC conversion circuit and/or the second AC-DC conversion circuit; and
wherein the first control unit is configured to control the first voltage conversion circuit and the second voltage conversion circuit to work in the constant-current charging stage, and control the third voltage conversion circuit to work in the trickle charging stage and/or the constant-voltage charging stage.

5. The device to-be-charged of claim 2, wherein the first control unit is further configured to:
generate feedback information according to at least one of the following charging parameters and feed back the feedback information to a wireless transmitting apparatus: a charging voltage across the battery, a charging current of the battery, an output current of the first AC-DC conversion circuit, an output voltage of the first AC-DC conversion circuit, an output current of the second AC-DC conversion circuit, and an output voltage of the second AC-DC conversion circuit;
wherein the charging voltage across the battery and the charging current of the battery are used for the wireless transmitting apparatus to determine a transmission power; and
wherein the output current of the first AC-DC conversion circuit, the output voltage of the first AC-DC conversion circuit, the output current of the second AC-DC conversion circuit, and the output voltage of the second AC-DC conversion circuit are used for the wireless transmitting apparatus to determine a transmission voltage when determining the transmission power.

6. The device to-be-charged of claim 2, wherein the first control unit is configured to:
determine a required charging power according to a charging voltage across the battery and/or a charging current of the battery; and
feed back the required charging power to a wireless transmitting apparatus, to make the wireless transmitting apparatus adjust a transmission power of an electromagnetic signal according to the required charging power.

7. The device to-be-charged of claim 2, wherein the first control unit is configured to:
determine a required current according to an output current and/or an output voltage of the first AC-DC conversion circuit, and/or according to an output current and/or an output voltage of the second AC-DC conversion circuit; and
feed back the required current to a wireless transmitting apparatus, to make the wireless transmitting apparatus adjust a transmission power of an electromagnetic signal according to the required current.

8. The device to-be-charged of claim 2, wherein the first control unit is configured to:
determine a required charging power according to a charging voltage across the battery and/or a charging current of the battery, and determine a required current according to an output current and/or an output voltage of the first AC-DC conversion circuit, and/or according to an output current and/or an output voltage of the second AC-DC conversion circuit;
determine a required voltage according to the required charging power and the required current; and
feed back the required voltage to a wireless transmitting apparatus, to make the wireless transmitting apparatus adjust a transmission power of an electromagnetic signal according to the required voltage.

9. The device to-be-charged of claim 8, wherein the first control unit is further configured to:
compare the required voltage with an output voltage of the first AC-DC conversion circuit and/or an output voltage of the second AC-DC conversion circuit that is currently received, to determine a voltage difference; and
feed back the voltage difference to the wireless transmitting apparatus, to make the wireless transmitting apparatus adjust a transmission power of an electromagnetic signal according to the voltage difference.

10. The device to-be-charged of claim 2, wherein the first control unit is further configured to:
send to a wireless transmitting apparatus feedback information indicating to increase a transmission voltage or decrease a transmission voltage.

11. The device to-be-charged of claim 1, wherein the first control unit is further configured to:
detect a temperature of the battery; and
send a first instruction to a wireless transmitting apparatus when the detected temperature of the battery is higher than a temperature threshold and lower than a preset temperature value;
wherein the first instruction is used for instructing the wireless transmitting apparatus to adjust a transmission power of an electromagnetic signal.

12. The device to-be-charged of claim 1, wherein the first control unit is further configured to:
detect a charging status of the device to-be-charged; and
send a second instruction to a wireless transmitting apparatus when the charging status is an abnormal charging status;
wherein the second instruction is used for instructing the wireless transmitting apparatus to stop transmitting an electromagnetic signal, so as to stop providing a transmission power to the device to-be-charged;
wherein the abnormal charging status comprises: a remaining power of the battery is higher than a preset power value, and/or a temperature of the battery is higher than a preset temperature value, and/or the charging voltage across the battery is higher than a preset voltage value, and/or the charging current of the battery is higher than a preset current value.

13. The device to-be-charged of claim 1, wherein the first control unit is further configured to:
obtain a maximum transmission power of a wireless transmitting apparatus; and
control the first charging unit or the second charging unit to work when the obtained maximum transmission power is lower than a preset power threshold.

14. A device to-be-charged, comprising:
a receiving coil comprising a first end, a second end, and N taps, N being a positive integer and N>1;
a first charging unit coupled with the first end and a first tap of the N taps of the receiving coil and configured to convert an electromagnetic signal received at the first end and the first tap into a first voltage and a first current for charging a battery;

an ith charging unit coupled with an (i−1)th tap and an ith tap of the N taps of the receiving coil and configured to convert an electromagnetic signal received at the (i−1)th tap and the ith tap into an ith voltage and an ith current for charging the battery, i being a positive integer and 1<i≤N; and an (N+1)th charging unit coupled with an Nth tap of the N taps and the second end of the receiving coil and configured to convert an electromagnetic signal received at the Nth tap and the second end into an (N+1)th voltage and an (N+1)th current for charging the battery;

wherein a kth charging unit comprises a kth alternating current (AC)-direct current (DC) conversion circuit and a kth voltage conversion circuit, the kth AC-DC conversion circuit is coupled with the kth voltage conversion circuit, and k is a positive integer and 1≤k≤N+1;

wherein the kth AC-DC conversion circuit is configured to perform AC-DC voltage conversion on a kth electromagnetic signal received from the receiving coil, to obtain an output voltage and an output current of the kth AC-DC conversion circuit; and wherein the kth voltage conversion circuit is configured to perform DC-DC voltage conversion on the output voltage and the output current of the kth AC-DC conversion circuit, to obtain a kth voltage and a kth current for charging the battery.

15. The device to-be-charged of claim 14, wherein the battery comprises a multi-cell series structure and a multi-cell parallel structure;

wherein when the battery is of the multi-cell parallel structure, a kth cell of the multiple cells is coupled with the kth voltage conversion circuit of the kth charging unit, to control the kth charging unit to charge the kth cell, and k is a positive integer and 1≤k≤N+1.

16. A wireless charging method, being applicable to a device to-be-charged and comprising:

receiving, via a receiving coil, an electromagnetic signal, the receiving coil comprising a first end, a second end, and a middle tap, a first charging unit being coupled with the first end and the middle tap of the receiving coil, and a second charging unit being coupled with the second end and the middle tap of the receiving coil;

converting, via the first charging unit, an electromagnetic signal received at the first end and the middle tap into a first voltage and a first current for charging a battery;

converting, via the second charging unit, an electromagnetic signal received at the second end and the middle tap into a second voltage and a second current for charging the battery; and applying the first voltage and the first current as well as the second voltage and the second current to the battery for charging;

controlling, via a first control unit, the first charging unit and/or the second charging unit to work according to a charging mode or a charging stage of the battery to charge the battery;

wherein the charging mode comprises a first charging mode and a second charging mode, wherein a charging speed in the first charging mode is higher than that in the second charging mode; and wherein the charging stage of the battery at least comprises one of the following charging stages: a trickle charging stage, a constant-current charging stage, and a constant-voltage charging stage.

\* \* \* \* \*